US 10,223,811 B2

(12) United States Patent
Ogawa et al.

(10) Patent No.: US 10,223,811 B2
(45) Date of Patent: Mar. 5, 2019

(54) IMAGE ENCODING METHOD, IMAGE DECODING METHOD, IMAGE ENCODING DEVICE AND IMAGE DECODING DEVICE

(71) Applicant: Panasonic Corporation, Osaka (JP)

(72) Inventors: Mayu Ogawa, Osaka (JP); Shinji Kitamura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 423 days.

(21) Appl. No.: 13/778,663

(22) Filed: Feb. 27, 2013

(65) Prior Publication Data
US 2013/0176431 A1    Jul. 11, 2013

Related U.S. Application Data

(63) Continuation of application No. PCT/JP2011/002286, filed on Apr. 19, 2011.

(30) Foreign Application Priority Data

Sep. 3, 2010  (JP) .................................. 2010-197834

(51) Int. Cl.
*G06T 9/00*  (2006.01)
*H04N 5/232*  (2006.01)
(Continued)

(52) U.S. Cl.
CPC ......... *G06T 9/008* (2013.01); *H04N 5/23229* (2013.01); *H04N 19/124* (2014.11);
(Continued)

(58) Field of Classification Search
CPC ............. H04N 19/593; H04N 5/23229; H04N 19/124; H04N 19/182; H04N 19/14; G06T 9/008
(Continued)

(56) References Cited

U.S. PATENT DOCUMENTS 5,337,087 A    8/1994  Mishima
5,491,761 A *  2/1996  Kim .................... G06T 9/005
                                                              358/1.9
(Continued)

FOREIGN PATENT DOCUMENTS

CN    1378384 A    11/2002
EP    1841233       3/2007
(Continued)

OTHER PUBLICATIONS

International Search Report of PCT Application No. PCT/JP2011/002286 dated Jun. 7, 2011.
(Continued)

*Primary Examiner* — Zaihan Jiang
(74) *Attorney, Agent, or Firm* — McDermott Will & Emery LLP

(57) ABSTRACT

In an image encoding device, a predicted pixel generator generates a predicted value for pixel data based on at least one of pixels adjacent to a pixel to be compressed. A quantization processor quantizes a difference value between the pixel data and the generated predicted value to a quantized value having a smaller number of bits than that of the pixel data to compress the pixel data to the quantized value. In a quantization width determiner, an edge determiner determines whether or not there are both a flat portion and an edge portion, based on a characteristic of the difference value in the group, and an edge pixel determiner determines whether each of pixels included in the group is a pixel in an edge portion or a pixel in a flat portion, based on the difference value, whereby a quantization width used in the quantization processor is determined.

28 Claims, 21 Drawing Sheets

(51) Int. Cl.
    *H04N 19/593*     (2014.01)
    *H04N 19/124*     (2014.01)
    *H04N 19/14*      (2014.01)
    *H04N 19/182*     (2014.01)

(52) U.S. Cl.
    CPC ........... *H04N 19/14* (2014.11); *H04N 19/182* (2014.11); *H04N 19/593* (2014.11)

(58) Field of Classification Search
    USPC ................... 348/143, 222.1; 382/238, 233
    See application file for complete search history.

(56) References Cited

U.S. PATENT DOCUMENTS

| | | | | |
|---|---|---|---|---|
| 6,097,757 | A * | 8/2000 | Boice | H04N 19/172 375/240 |
| 7,826,533 | B2 * | 11/2010 | Hsieh | H04N 19/176 375/240.04 |
| 2001/0028749 | A1 * | 10/2001 | Kimura | G06T 9/40 382/240 |
| 2002/0181583 | A1 * | 12/2002 | Corbera | H04N 19/176 375/240.03 |
| 2007/0009163 | A1 | 1/2007 | Sasaki et al. | |
| 2007/0177671 | A1 * | 8/2007 | Yang | H04N 19/597 375/240.25 |
| 2007/0223824 | A1 | 9/2007 | Kato et al. | |
| 2008/0170629 | A1 * | 7/2008 | Shim | H04N 7/26425 375/240.29 |
| 2008/0232707 | A1 * | 9/2008 | Lee | G06T 5/003 382/255 |
| 2008/0260278 | A1 * | 10/2008 | Zuo | H04N 19/176 382/251 |
| 2009/0052530 | A1 * | 2/2009 | Odagiri | H04N 19/105 375/240.12 |
| 2009/0052790 | A1 | 2/2009 | Odagiri et al. | |
| 2009/0067734 | A1 * | 3/2009 | Kalevo | G06T 9/004 382/238 |
| 2009/0079876 | A1 * | 3/2009 | Takeshima | G06T 3/4069 348/699 |
| 2009/0244307 | A1 | 10/2009 | Nagaishi et al. | |
| 2010/0142811 | A1 | 6/2010 | Okamoto et al. | |
| 2011/0170794 | A1 | 7/2011 | Ogawa et al. | |
| 2011/0200263 | A1 | 8/2011 | Ogawa | |

FOREIGN PATENT DOCUMENTS

| | | |
|---|---|---|
| EP | 1912445 | 4/2008 |
| EP | 1936957 | 6/2008 |
| JP | 6-098306 | 4/1994 |
| JP | 2007-036566 | 2/2007 |
| JP | 2007-104525 | 4/2007 |
| JP | 2007-228515 | 9/2007 |
| JP | 02011004285 A * | 6/2009 |

OTHER PUBLICATIONS

Second Chinese Office Action dated Nov. 24, 2015 in Application No. 201180041297.0.

* cited by examiner

FIG.6A

ORDER OF INPUTS TO IMAGE ENCODING DEVICE 300 →

| | P1 | P2 | P3 | P4 | P5 | P6 |
|---|---|---|---|---|---|---|
| INPUT VALUE | 150 | 1023 | 148 | 154 | 155 | 158 |
| DIFFERENCE VALUE | | 873 | -875 | 6 | 1 | 3 |
| ABSOLUTE DIFFERENCE VALUE | | 873 | 875 | 6 | 1 | 3 |
| NUMBER OF BITS OF ABSOLUTE DIFFERENCE VALUE | | 10 | 10 | 3 | 1 | 2 |
| UNIT QUANTIZATION WIDTH | | 4 | 4 | 0 | 0 | 0 |
| EDGE FLAG | | 1 | 1 | 0 | 0 | 0 |
| INITIAL QUANTIZATION WIDTH | | | | 4 | | |
| EDGE PORTION QUANTIZATION WIDTH | | | | 5 | | |
| FLAT PORTION QUANTIZATION WIDTH | | | | 2 | | |
| QUANTIZATION WIDTH | | 5 | 5 | 2 | 2 | 2 |
| VALUE TO BE COMPRESSED | | 873 | 866 | 4 | 1 | 4 |
| QUANTIZED VALUE | | 27 | -27 | 1 | 0 | 1 |
| INVERSE QUANTIZED VALUE | | 864 | -864 | 4 | 0 | 4 |
| RESULT OF DECODING | 150 | 1014 | 150 | 154 | 154 | 158 |
| ERROR | 0 | -9 | 2 | 0 | -1 | 0 |

FIG.6B

ORDER OF INPUTS TO IMAGE ENCODING DEVICE 300 →

| | P1 | P2 | P3 | P4 | P5 | P6 |
|---|---|---|---|---|---|---|
| INPUT VALUE | 150 | 1023 | 148 | 154 | 155 | 158 |
| DIFFERENCE VALUE | | 873 | −875 | 6 | 1 | 3 |
| ABSOLUTE DIFFERENCE VALUE | | 873 | 875 | 6 | 1 | 3 |
| NUMBER OF BITS OF ABSOLUTE DIFFERENCE VALUE | | 10 | 10 | 3 | 1 | 2 |
| UNIT QUANTIZATION WIDTH (QUANTIZATION WIDTH) | | 4 | 4 | 0 | 0 | 0 |
| INITIAL QUANTIZATION WIDTH | 4 | | | | | |
| VALUE TO BE COMPRESSED | | 873 | 882 | 4 | 5 | 8 |
| QUANTIZED VALUE | | 55 | −55 | 0 | 0 | 1 |
| INVERSE QUANTIZED VALUE | | 880 | −880 | 0 | 0 | 16 |
| RESULT OF DECODING | 150 | 1030 | 150 | 150 | 150 | 166 |
| ERROR | 0 | 7 | 2 | −4 | −5 | 8 |

FIG.8

| NUMBER OF BITS OF DIFFERENCE VALUE D | RESULT OF DETERMINATION BY EDGE DETERMINER 309 | QUANTIZATION WIDTH | QUANTIZATION INFORMATION |
|---|---|---|---|
| 1 | 0 | 0 | 000 |
| 2 | 0 | 0 | 000 |
| 3 | 0 | 0 | 000 |
| 4 | 0 | 0 | 000 |
| 5 | 0 | 0 | 000 |
| 6 | 0 | 0 | 000 |
| 7 | 0 | 0 | 000 |
| 8 | 0 | 1 | 001 |
| 9 | 0 | 2 | 010 |
| 10 | 0 | 3 | 011 |
| 11 | 0 | 4 | 100 |
| 11 | 1 | 2 OR 5 | 101 |

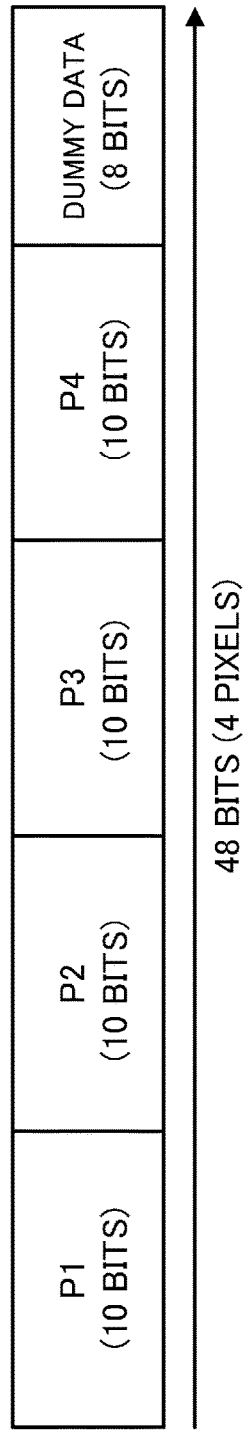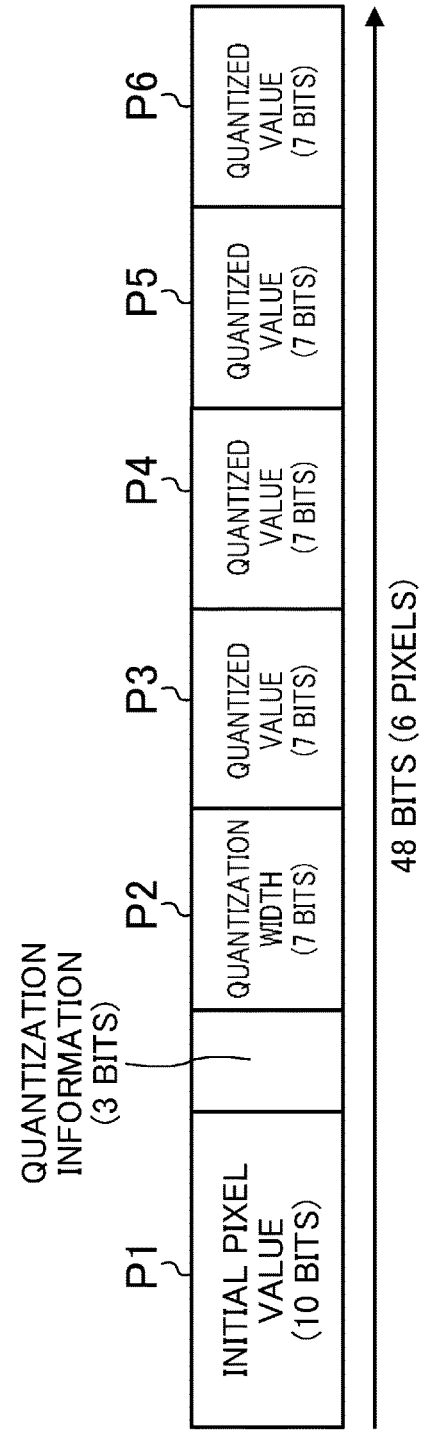

FIG.13

| LARGEST QUANTIZATION WIDTH Q_MAX | SMALLEST QUANTIZATION WIDTH Q_MIN | THRESHOLD TH1 | THRESHOLD TH2 | EDGE PORTION QUANTIZATION WIDTH | FLAT PORTION QUANTIZATION WIDTH |
|---|---|---|---|---|---|
| 4 | 0 | 3 | 2 | 5 | 2 |
| 3 | 0 | 3 | 1 | 4 | 1 |

FIG.15

| NUMBER OF BITS OF DIFFERENCE VALUE D | RESULT OF DETERMINATION BY EDGE DETERMINER 309 | QUANTIZATION WIDTH | QUANTIZATION INFORMATION |
|---|---|---|---|
| 1 – 7 | 0 | 0 | 000 |
| 8 | 0 | 1 | 001 |
| 9 | 0 | 2 | 010 |
| 10 | 0 | 3 | 011 |
| 11 | 0 | 4 | 100 |
| 11 | 1 | 2 OR 5 | 101 |
| 10 | 1 | 1 OR 4 | 110 |

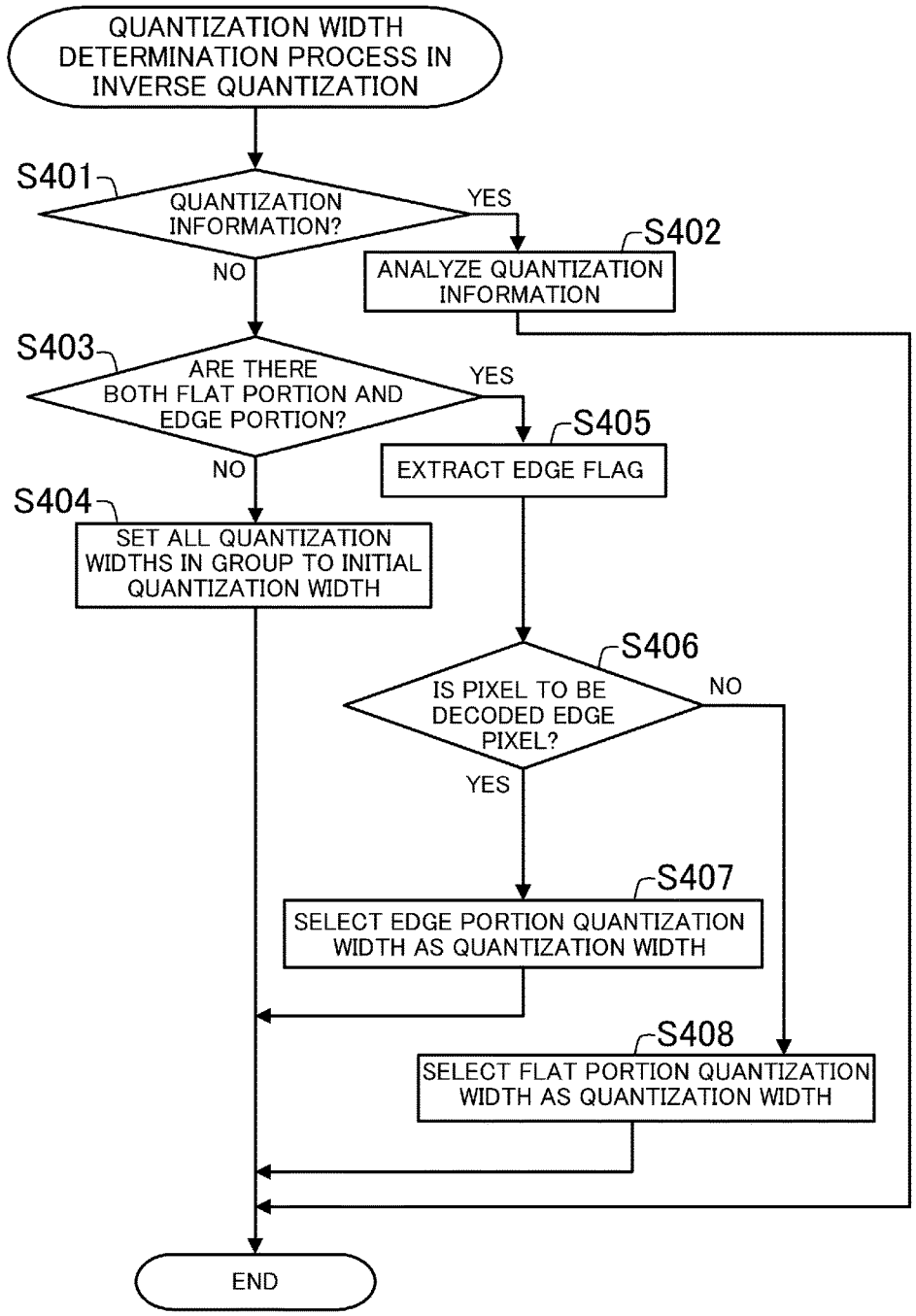

IMAGE ENCODING METHOD, IMAGE DECODING METHOD, IMAGE ENCODING DEVICE AND IMAGE DECODING DEVICE

CROSS-REFERENCE TO RELATED APPLICATIONS

This is a continuation of PCT International Application PCT/JP2011/002286 filed on Apr. 19, 2011, which claims priority to Japanese Patent Application No. 2010-197834 filed on Sep. 3, 2010. The disclosures of these applications including the specifications, the drawings, and the claims are hereby incorporated by reference in their entirety.

BACKGROUND

The present disclosure relates to image encoding methods and devices which are used in apparatuses which handle images, such as digital still cameras, network cameras, etc., in order to increase the rate of data transfer or reduce memory usage by image compression.

In recent years, as the number of pixels of an imaging element used in an imaging device, such as a digital still camera, a digital camcorder, etc., has increased, the amount of image data which is processed by an integrated circuit included in the device has also increased. In order to handle a large amount of image data, for example, the operating frequency or memory capacity may be increased to provide a sufficient bus width for data transfer in the integrated circuit. However, this leads directly to an increase in cost.

In the imaging device, such as a digital still camera, a digital camcorder, etc., after all image processing has been completed in the integrated circuit, the resulting data is typically recorded to an external recording device, such as an SD card etc. An image to be recorded is compressed before being recorded, whereby an image having a larger size or a larger number of images can be stored in an external recording device having the same capacity than without compression. The compression process is achieved by an encoding technique, such as JPEG, MPEG, etc.

Japanese Patent Publication No. 2007-228515 describes a technique of performing an image data compression process on a pixel signal (RAW data) input from an imaging element as well in order to reduce a bus band required during writing and reading of a memory and thereby achieve high-speed operation even when the imaging element has a larger number of pixels, i.e., the amount of signal processing increases. Also, a fixed-length encoding technique is employed to ensure the bus band and reduce the amount of the compression process. The fixed-length encoding of image data is implemented as follows: the largest and smallest values of pixel data in an arbitrary image region are calculated to obtain a local dynamic range in the region; and values obtained by subtracting the calculated smallest value from all pixels in the region are quantized using a quantization width corresponding to the obtained dynamic range.

Japanese Patent Publication No. 2007-036566 describes a technique of compressing RAW data to reduce memory usage and thereby increase the number of images which can be shot in a single burst, based on the fact that the number of images which can be shot in a single burst typically depends on the amount of RAW data which can be stored in a buffer memory. Also in Japanese Patent Publication No. 2007-036566, fixed-length encoding is employed to ensure a predetermined number of images which can be shot in a single burst. The fixed-length encoding is implemented as follow: a quantization width is determined based on a difference value between adjacent pixels, and an offset value uniquely obtained from the quantization width is subtracted from a pixel value to be compressed to determine a value to be quantized. Therefore, an image encoding device and an image decoding device are provided in which a compression process is achieved without the need of a memory while ensuring that the amount of an encoding process is low.

Also, Japanese Patent Publication No. 2007-104525 describes compression of RAW data, and relates to handling of defective pixels in an imaging element. Japanese Patent Publication No. 2007-104525 describes an image encoding device in which even when pixel data containing information indicating the presence of a defective pixel is input, the defective pixel is correctly detected and corrected in image processing at a succeeding stage. The image encoding device is implemented as follows: if a pixel is defective, the pixel is assigned to a specific representative quantized value, and otherwise, the pixel is assigned to a quantized value other than the specific representative quantized value, whereby information indicating the presence of a defective pixel can be reversibly encoded or decoded, and therefore, can be reliably recovered and correctly corrected in a process at a succeeding stage.

SUMMARY

However, in the imaging device of Japanese Patent Publication No. 2007-228515, the difference value from the smallest value in the same region is quantized, and therefore, the quantization width increases with an increase in the dynamic range in the region. This is based on the properties of visual perception that when the dynamic range of a region is wide, the image is highly likely to have a large change, and therefore, it is difficult to visually perceive a small change in level. However, if there is a defective pixel of the imaging element, such as a white spot etc., in a dark image, the difference between the largest and smallest values is extremely large in a region including the defective pixel. In this case, it is determined that the region including the defective pixel has a wide dynamic range, irrespective of a change in a subject. All pixels contained in the region are quantized using a large quantization width, and therefore, a large degradation is visually perceived, which is a problem.

Also in Japanese Patent Publication No. 2007-036566, a quantization width is determined based on the largest difference value between a pixel to be compressed and the immediately previous pixel, and quantization is performed using the quantization width. Therefore, a problem arises due to a similar principle.

FIG. 1 is a block diagram showing a digital signal processing circuit 100 including an image encoding device and an image decoding device of Japanese Patent Publication No. 2007-104525. Japanese Patent Publication No. 2007-104525 aims at speeding up the process by reducing the bus band during writing and reading RAW data to and from a memory. To achieve this, pixel data preprocessed by a preprocessor 103 is compressed by the image encoding device 101, and the resulting pixel data is stored to the memory 105. In the image decoding device 102, the pixel data stored in the memory 105 is decompressed, and the resulting data is transferred to a signal processor 104. In this case, in Japanese Patent Publication No. 2007-104525, in the image encoding device 101, when a pixel value is a specific pixel value, it is determined that the pixel is defective, and a specific representative quantized value is assigned to the pixel value to encode the pixel value. In the image decoding device 102, when the encoded representative quantized value is a specific representative quantized value, it is determined that the pixel is defective, and a specific pixel value is assigned to the encoded representative quantized value to decode the encoded representative quantized value. As a result, information indicating the presence of a defective pixel is reversibly encoded and decoded. However, in Japanese Patent Publication No. 2007-104525, the location of a defective pixel in an image is previously detected in the preprocessor 103, and the pixel value is assigned to a specific pixel value. Japanese Patent Publication No. 2007-104525 does not describe a case where the pixel value of a defective pixel is directly input to the image encoding device 101.

On the other hand, in image processing performed by an integrated circuit included in a digital still camera etc., typically, pixel data input from an imaging element is temporarily stored in a memory, such as a synchronous dynamic random access memory (SDRAM) etc. Thereafter, predetermined image processing, YC signal generation, zooming (e.g., enlargement/reduction etc.), etc. is performed on the temporarily stored pixel data, and the resulting pixel data is temporarily stored back to the SDRAM. In this case, it is often necessary to read pixel data of an arbitrary region from the memory, e.g., when an arbitrary region of an image is extracted, when image signal processing which needs to reference upper and lower pixels or calculate a correlation therebetween is performed, etc. In this case, for variable-length encoded data, it is not possible to read an arbitrary region from an intermediate point in the encoded data, i.e., there is lack of random accessibility. Therefore, in Japanese Patent Publication No. 2007-036566, variable-length codes are converted into fixed-length codes by quantization, whereby memory usage and the frequency of memory access are reduced.

The present disclosure describes implementations of an image encoding method employing fixed-length encoding in which quantization widths used in a quantization process are adaptively changed on a pixel-by-pixel basis while random accessibility is maintained, whereby the influence of occurrence of a defective pixel or a steep edge on a flat region is reduced or eliminated.

An example image encoding method according to the present disclosure is an image encoding method for receiving pixel data of a pixel to be compressed, and compressing the input pixel data, including a predicted pixel generation step of generating a predicted value for the pixel data based on at least one of pixels adjacent to the pixel to be compressed, a quantization step of quantizing a difference value between the pixel data and the predicted value generated in the predicted pixel generation step to a quantized value having a smaller number of bits than that of the pixel data, to compress the pixel data to the quantized value, and a quantization width determination step of determining a quantization width used in the quantization step. In the quantization width determination step, it is determined whether or not there are both a flat portion and an edge portion, in groups of a plurality of the pixels, and based on a result of the determination, quantization widths used in the quantization step are adaptively changed on a pixel-by-pixel basis.

Therefore, in the present disclosure, it is determined whether or not there are both a flat portion and an edge portion, and based on the determination result, quantization widths in the quantization process are adaptively changed on a pixel-by-pixel basis. Therefore, even in a region in which a defective pixel or a steep edge occurs, an influence of a quantization error on a flat region can be reduced or eliminated.

Also, in the present disclosure, the image encoding method can be implemented by fixed-length encoding. Therefore, even when a plurality of portions of generated fixed-length encoded data are stored in, for example, a memory etc., encoded data corresponding to a pixel at a specific location in an image can be easily identified. As a result, random accessibility to encoded data can be maintained. In other words, in the present disclosure, a degradation in image quality in a region in which a defective pixel or a steep edge occurs can be reduced or prevented while random accessibility to a memory is maintained, compared to the conventional art.

As described above, according to the example image encoding method of the present disclosure, even in a region in which a defective pixel or a steep edge occurs, an influence of a quantization error on a flat region can be reduced or eliminated.

Moreover, according to the present disclosure, a degradation in image quality in a region in which a defective pixel or a steep edge occurs can be reduced or prevented while random accessibility to a memory is maintained, compared to the conventional art.

BRIEF DESCRIPTION OF THE DRAWINGS

FIG. 6A is a diagram showing an example image encoding process of the first embodiment and the results of calculations.

FIG. 6B is a diagram showing a conventional image encoding process to which the first embodiment is not applied, and the results of calculations.

FIG. 8 is a diagram showing quantization information in the first embodiment.

FIG. 9A is a diagram showing a schematic bit arrangement before image encoding.

FIG. 9B is a diagram showing a schematic bit arrangement after image encoding.

FIG. 13 is a diagram showing selection patterns of an edge portion quantization width and a flat portion quantization width in a second embodiment of the present disclosure.

FIG. 15 is a diagram showing quantization information in the second embodiment.

FIG. 20 is a flowchart showing a method for determining a quantization width in the image decoding method of the first embodiment of the present disclosure.

DETAILED DESCRIPTION

Figure 1:
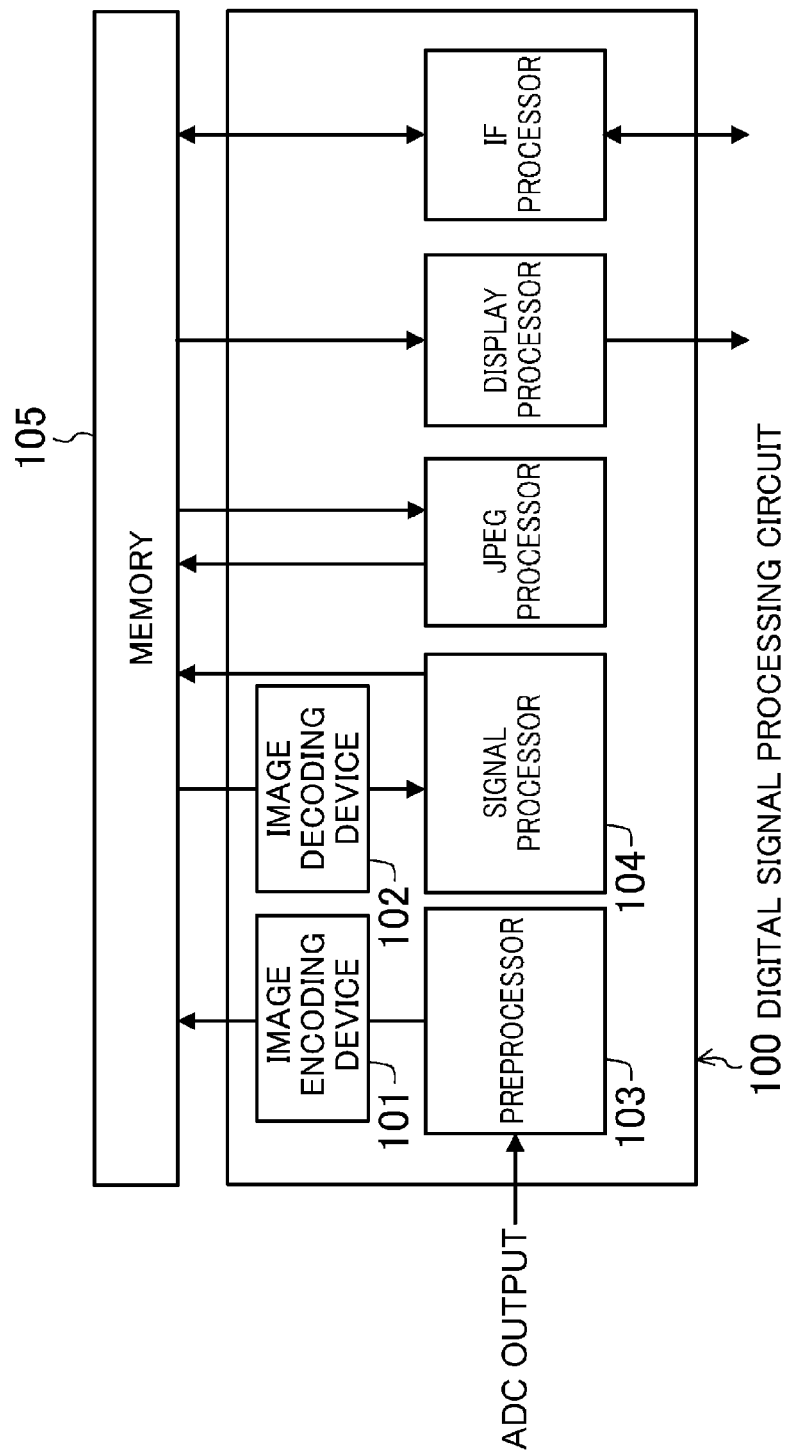
FIG. 1 is a block diagram for describing a conventional digital signal processing circuit.

Embodiments of the present disclosure will be described hereinafter with reference to the accompanying drawings. Note that, in the embodiments and variations described below, parts having the same or similar function are indicated by the same reference characters and will not be redundantly described.

First Embodiment

All or a part of an encoding process of an image encoding device and a decoding process of an image decoding device in this embodiment may be implemented as a program which is executed by hardware (e.g., an large scale integration (LSI) circuit etc.), a central processing unit (CPU), etc. The same applies to the embodiments below.

<Image Encoding Process>

Firstly, a process of encoding an image (hereinafter referred to as an "image encoding process") which is performed by an image encoding device 300 will be described with reference to FIGS. 2 and 3. The image encoding device 300 shown in FIG. 3 is, for example, included in a solid-state image sensor.

Figure 2:
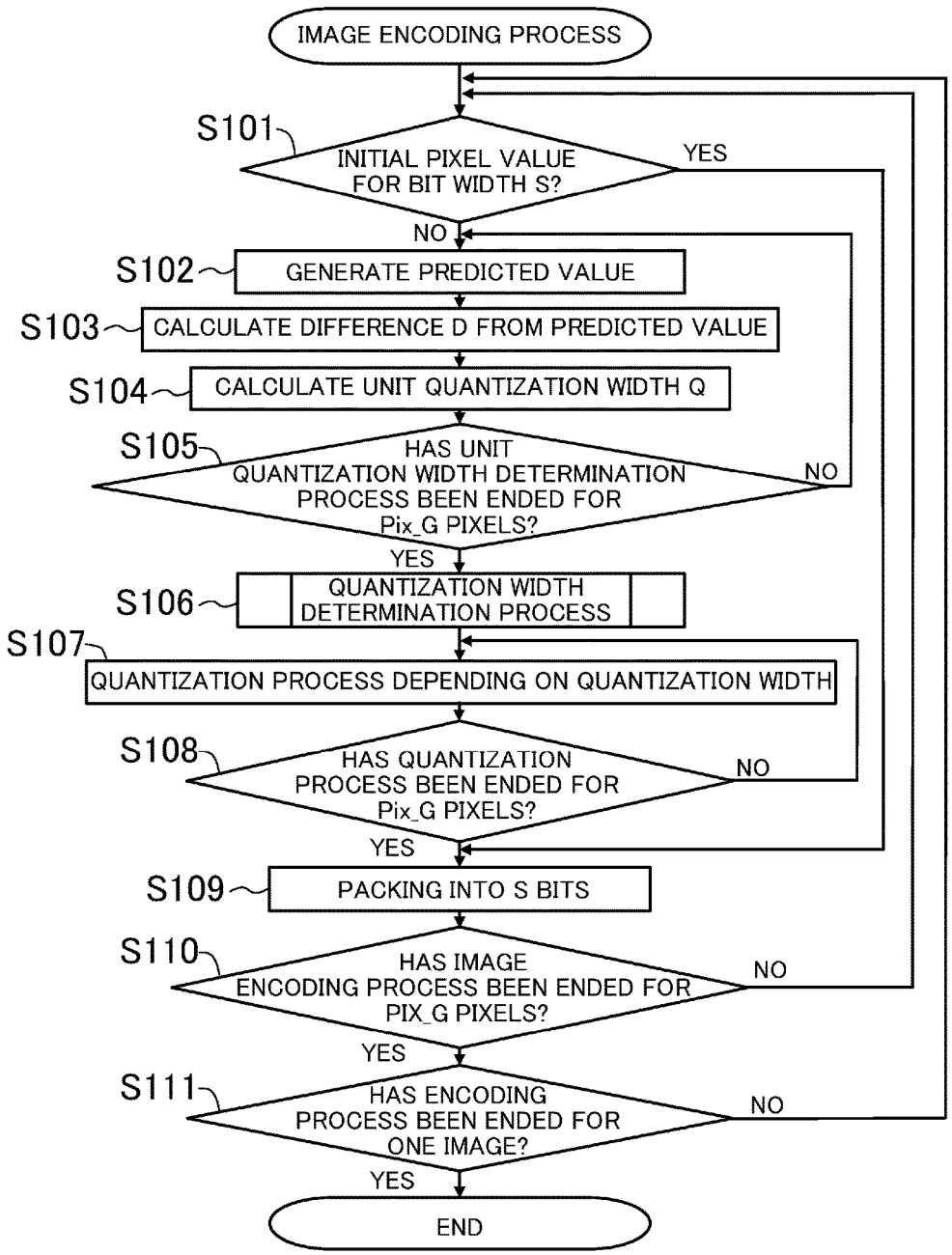
FIG. 2 is a flowchart showing an image encoding method according to a first embodiment of the present disclosure.
Figure 3:
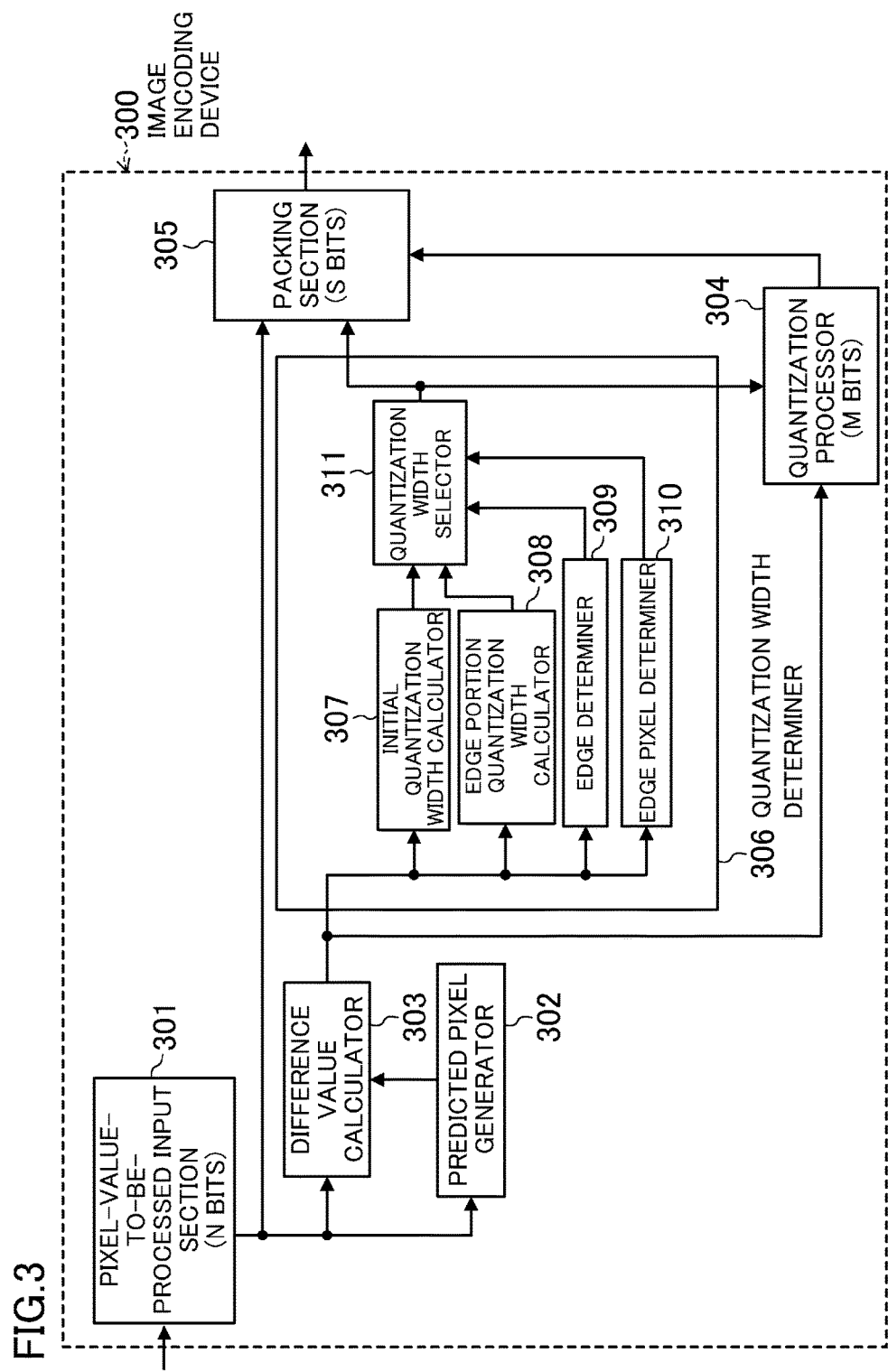
FIG. 3 is a block diagram showing a configuration of the image encoding device of the first embodiment.

FIG. 2 is a flowchart showing an image encoding method according to the first embodiment of the present disclosure. FIG. 3 is a block diagram showing a configuration of the image encoding device 300 of the first embodiment of the present disclosure.

A pixel to be encoded is input to a pixel-value-to-be-processed input section 301. In this embodiment, it is assumed that each portion of pixel data is digital data having a bit length of N bits (also referred to as N-bit digital data), and quantized pixel data (hereinafter referred to as a "quantized value") corresponding to each portion of pixel data has a bit length of M bits. A pixel value (hereinafter referred to an "initial pixel value") of at least one leading pixel to be encoded, quantized values corresponding to a plurality of portions of pixel data, and a code (hereinafter referred to as "quantization information") indicating information about the quantization widths of the quantized values, are packed into a bit length of S bits by a packing section 305. Thereafter, the packed data is output from the image encoding device 300.

Note that, here, it is assumed that the natural numbers N, M and S are previously determined.

The pixel data which has been input to the pixel-value-to-be-processed input section 301 is output, with appropriate timing, from the pixel-value-to-be-processed input section 301 to a predicted pixel generator 302 and a difference calculator 303. Note that when a pixel of interest to be encoded is input as an initial pixel value (YES in step S101 of FIG. 2), the pixel-value-to-be-processed input section 301 outputs the received pixel to be encoded, as an N-bit initial pixel value, to the packing section 305 directly without the quantization process. The initial pixel value is used as a reference when a difference is calculated. In this embodiment, at least one initial pixel value is inserted every S-bit packed data.

If the pixel of interest to be encoded is not an initial pixel value (NO in step S101 of FIG. 2), control proceeds to a predicted pixel generation process. In the predicted pixel generation process, pixel data input to the predicted pixel generator 302 is one of an initial pixel value which has been input prior to the pixel of interest to be encoded, a previous pixel to be encoded, or pixel data which has been encoded, and transferred to and decoded by an image decoding device described below. The predicted pixel generator 302 generates a predicted value for the pixel of interest to be encoded, using the input pixel data (step (predicted pixel generation step) S102 of FIG. 2).

Note that, here, there is a technique of encoding pixel data which is called predictive encoding. Predictive encoding is a technique of generating a predicted value for a pixel to be encoded, and encoding a difference value between the pixel value of the pixel to be encoded and the predicted value. In predictive encoding, when pixel data is input, based on the fact that it is highly likely that the values of adjacent pixels are the same as or close to each other, the value of a pixel to be encoded is predicted based on the pixel value of adjacent pixel data, whereby the difference value is reduced to the extent possible and therefore the quantization width is reduced.

Figure 5:
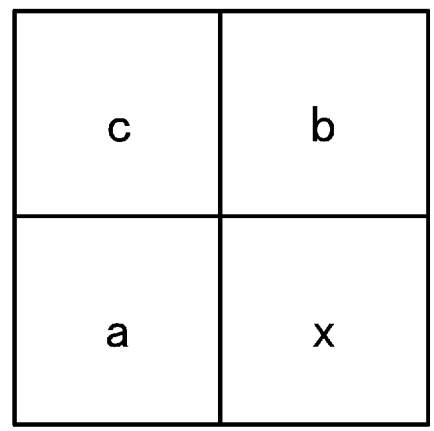
FIG. 5 is a diagram for describing prediction expressions used in a predicted pixel generator included in the image encoding device.

FIG. 5 is a diagram showing an arrangement of adjacent pixels which are used in calculation of a predicted value, where "x" indicates the pixel value of a pixel of interest to be predicted, and "a," "b" and "c" indicate the pixel values of three adjacent pixels for calculating a predicted value "y" of the pixel to be encoded. The predicted value "y" is typically calculated by one of the following expressions.

$$y=a \tag{1}$$

$$y=b \tag{2}$$

$$y=c \tag{3}$$

$$y=a+b-c \tag{4}$$

$$y=a+(b-c)/2 \tag{5}$$

$$y=b+(a-c)/2 \tag{6}$$

$$y=(a+b)/2 \tag{7}$$

Thus, the predicted pixel generator 302 calculates the predicted value "y" of the pixel to be encoded using the pixel values "a," "b" and "c" of the adjacent pixels of the pixel to be encoded. The predicted pixel generator 302 calculates a prediction error Δ (=y−x) between the predicted value "y" and the pixel value "x" of the pixel to be encoded, and encodes the prediction error Δ. The predicted pixel generator 302 calculates a predicted value using one of the prediction expressions (1)-(7) used in predictive encoding, and outputs the calculated predicted value to the difference value calculator 303. Note that the present disclosure is not limited to the above prediction expressions. If a sufficient internal memory buffer is available for the compression process, the values of pixels farther from the pixel to be encoded than the adjacent pixels may be stored in the memory buffer and used for prediction to improve the accuracy of the prediction. In this embodiment, as an example, the prediction expression (1) is used in step S102.

The difference value calculator 303 generates a difference value D between the pixel value of a pixel to be encoded received from the pixel-value-to-be-processed input section 301 and a predicted value received from the predicted pixel generator 302 to obtain a prediction error. The difference value calculated in step S103 of FIG. 2 is output to a quantization width determiner 306 and a quantization processor (quantizer) 304.

The quantization width determiner 306 initially determines a quantization width (hereinafter referred to as a "unit quantization width Q") for the difference value D of a pixel of interest to be encoded, based on difference values D corresponding to pixels to be encoded which have been received from the difference value calculator 303.

The unit quantization width Q refers to a value which is obtained by subtracting the bit length M of a quantized value from a value obtained by adding one to the number of digits (number of bits) of a binary code representing the absolute value of a difference value D (hereinafter referred to as an absolute difference value). In other words, the quantization width Q is equal to a difference between the number of bits required for a signed integer binary representation of a difference value D and the bit length M of a quantized value. Here, it is assumed that Q is a positive integer, and when the number of bits of a difference value D is smaller than M, Q is "0" (step S104 of FIG. 2). Note that the unit quantization width Q is a value for determining a substantial quantization width, and is not a quantization width itself in the quantization process. The calculated unit quantization width Q is input to an initial quantization width calculator 307, an edge portion quantization width calculator 308, an edge determiner 309, and an edge pixel determiner 310 in the quantization width determiner 306.

In step S105, the quantization width determiner 306 determines whether or not the unit quantization width Q has been determined for the pixel data of all of a predetermined number Pix_G of pixels (a plurality of pixels to be encoded).

Here, as the pixel number Pix_G increases, the influence of other pixel data increases, and therefore, disadvantageously, a degradation in image quality due to a quantization error is more likely to occur. However, advantageously, the number of pixels which can be transmitted using the same bit length S increases, and therefore, the compression ratio increases.

If the determination result in step S105 is negative (NO), control proceeds to step S102, in which at least one of steps S102-S104 is executed on the next pixel to be encoded received by the pixel-value-to-be-processed input section 301. On the other hand, if the determination result in step S105 is positive (YES), control proceeds to step S106.

Figure 4:
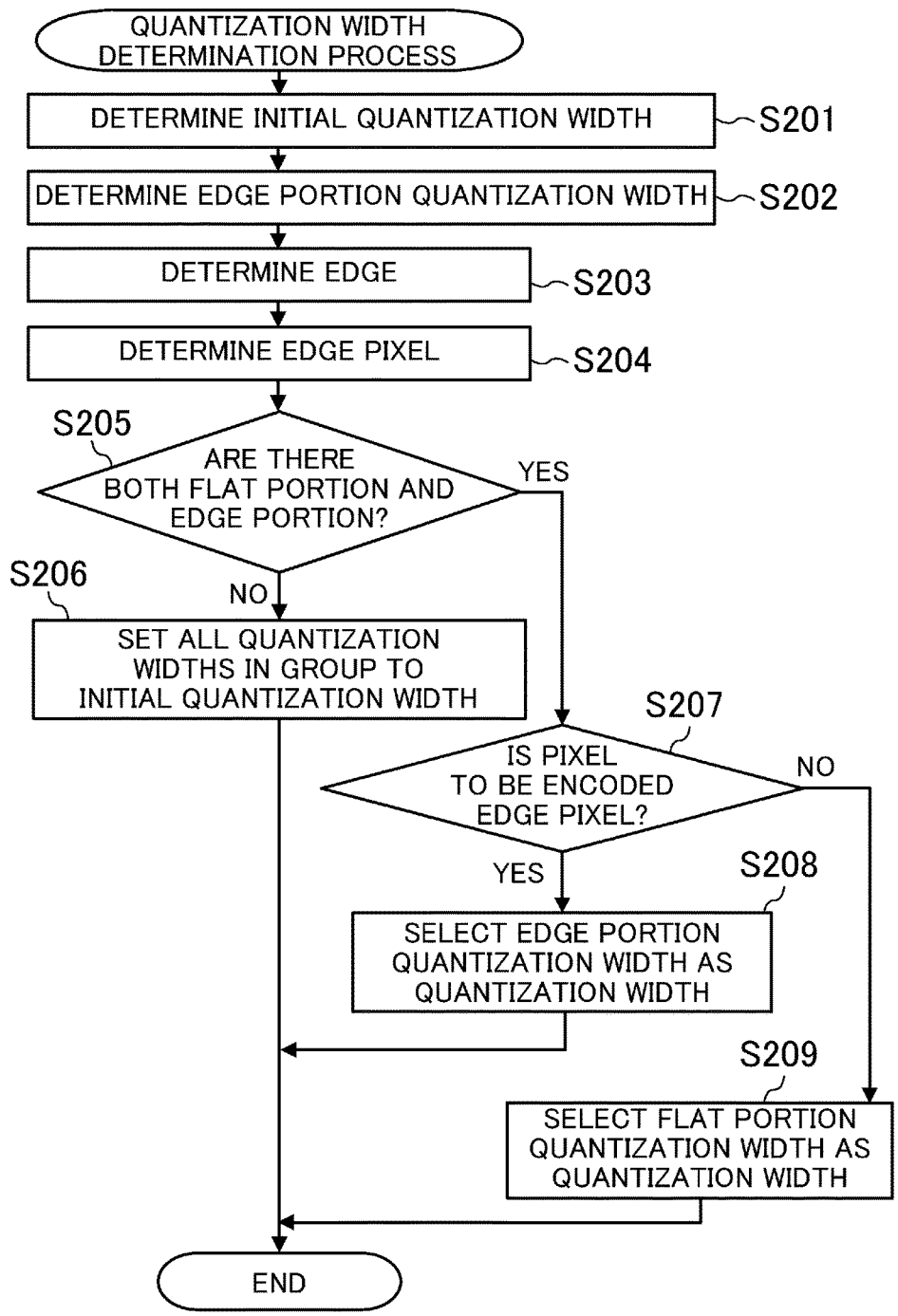
FIG. 4 is a flowchart showing a method for determining a quantization width in the image encoding method of the first embodiment.

FIG. 4 is a flowchart showing a method for determining a quantization width in this embodiment, in which details of step (quantization width determination step) S106 are shown. A quantization width determination process of step S106 will be described with reference to FIG. 4.

In step S106, in the quantization width determiner 306, a quantization width selector 311 selects a quantization width corresponding to a pixel to be encoded from an initial quantization width which is output from the initial quantization width calculator 307, and an edge portion quantization width and a flat portion quantization width which are output from the edge portion quantization width calculator 308.

In the quantization width determination step of FIG. 4, initially, step S201 is performed. In step (initial quantization width calculation step) S201, the initial quantization width calculator 307 calculates and determines a common quantization width as an initial quantization width (first quantization width) for each group of pixels (the number of pixels in each group is Pix_G). The common quantization width of each group is used in quantization of every pixel to be encoded in that group. Specifically, a largest quantization width Q_MAX of Pix_G unit quantization widths Q corresponding to Pix_G pixels to be encoded in a group is determined as an initial quantization width. After the initial quantization width has been determined in step S201, control proceeds to step S202.

In step (edge portion quantization width calculation step) S202, the edge portion quantization width calculator 308 calculates a quantization width which is to be used when a picture in a group has both a flat portion and an edge portion. Specifically, the edge portion quantization width calculator 308 calculates two quantization widths, i.e., an edge portion quantization width (second quantization width) which is a quantization width used in an edge portion quantization process, and a flat portion quantization width (third quantization width) which is a quantization width used in a flat portion quantization process. Specifically, the edge portion quantization width calculator 308 sets a quantization width obtained by adding one to the initial quantization width as the edge portion quantization width, and a value smaller than the initial quantization width as the flat portion quantization width. After the edge portion quantization width and the flat portion quantization width have been determined in step S202, control proceeds to step S203.

In step (edge determination step) S203, the edge determiner 309 determines whether or not a picture in a group to which a pixel to be encoded belongs has both a flat portion and an edge portion. The edge determiner 309 calculates a difference between the largest quantization width Q_MAX and a smallest quantization width Q_MIN of Pix_G unit quantization widths Q corresponding to Pix_G pixels to be encoded in a group. If the difference is larger than or equal to a predetermined threshold (first threshold) TH1, the edge determiner 309 determines that a picture in a group of interest has both a flat portion and an edge portion. This is because that the difference between the quantization width Q_MAX and the quantization width Q_MIN is larger than or equal to the predetermined threshold TH1 suggests that the group includes a pixel to be encoded having a large difference from the predicted value and a pixel to be encoded having a small difference from the predicted value, i.e., there are both a flat region and an edge. After, in step S203, it has been determined whether or not there are both a flat portion and an edge portion, control proceeds to step S204.

In step (edge pixel determination step) S204, the edge pixel determiner 310 determines whether or not each pixel to be encoded in a group is a pixel in which there is an edge (hereinafter referred to as an edge pixel). In edge pixels, the difference value between the pixel value of a pixel to be encoded and the predicted value is sufficiently large. Therefore, if the value of the unit quantization width Q corresponding to a pixel to be encoded is larger than or equal to a predetermined threshold (fourth threshold) TH2, it is determined that the pixel is an edge pixel. After edge pixels in a group have been determined, control proceeds to step S205.

Note that steps S201-S204 may be performed in parallel.

Next, in step S205, if the edge determiner 309 determines that a picture in a group to which a pixel to be encoded belongs has both a flat portion and an edge portion (YES in step S205), control proceeds to step S207. On the other hand, if the determination result in step S205 is negative (NO), control proceeds to step S206 described below.

In step S207, if the edge pixel determiner 310 determines that a pixel of interest to be encoded is an edge pixel, control proceeds to step S208.

In step S208, because the pixel of interest to be encoded is an edge pixel, the edge portion quantization width calculated by the edge portion quantization width calculator 308 is selected as a quantization width corresponding to the pixel to be encoded. If the determination result in step S207 is negative (NO), control proceeds to step S209.

In step S209, based on the determination results in the edge determiner 309 and the edge pixel determiner 310, it can be determined that the pixel of interest to be encoded is located in a flat portion close to an edge, and therefore, the flat portion quantization width calculated by the edge portion quantization width calculator 308 is selected as a quantization width corresponding to the pixel to be encoded.

If the determination result in step S205 is negative (NO), it can be determined that a picture in a group to which the pixel to be encoded belongs is a generally flat one or a complicated one in which a change having a large difference value between the predicted value and the pixel value of the pixel to be encoded occurs in a plurality of regions. In other words, this can be said to be a condition under which even if all pixels to be encoded are quantized using a large quantization width, a degradation is less likely to be visually perceived, because the initial quantization width is originally small or the picture is complicated. Therefore, in step S206, all quantization widths for pixels to be encoded in a group are set to the initial quantization width calculated by the initial quantization width calculator 307.

After a quantization width has been determined for all pixels, control proceeds to step S107.

In step (quantization step) S107, the quantization processor 304 performs a quantization process. The quantization processor 304 performs a quantization process of quantizing a difference value D between the pixel value of a pixel to be encoded and the predicted value, which is received from the difference value calculator 303, using the quantization width determined by the quantization width selector 311. Note that the quantization process is to shift the difference value D downward (toward the least significant bit) by the number of bits corresponding to the quantization width. When the quantization width is "0," the quantization processor 304 does not perform quantization. The quantized value output from the quantization processor 304 is transferred to the packing section 305.

In step S108, it is determined whether or not the quantization process has been completed for all Pix_G pixels to be encoded in a group. If the determination result in step S108 is negative (NO), control proceeds to step S107, in which the quantization process is executed on the next pixel to be encoded in the same group. On the other hand, if the determination result in step S108 is positive (YES), control proceeds to step S109.

In step (packing step) S109, the packing section 305 combines and packs the initial pixel value of at least one pixel, a plurality of quantized values, and at least one portion of J-bit quantization information (J is a natural number), into S bits. Moreover, if the determination result of the edge determiner 309 indicates that there are both a flat portion and an edge portion, a 1-bit edge flag is inserted into the quantized value. Thereafter, the packing section 305 outputs the packed data to an external memory (e.g., an SDRAM etc.) or an image decoding device described below. The fixed bit length S may be set to the number of bits which is the same as the number of bits of a bus width for data transfer in an integrated circuit which is employed. If an unused bit(s) remain in a rear portion of the packed data, dummy data is recorded so that the packed data has a bit length of S bits.

Next, the image encoding process of this embodiment will be described in detail.

FIGS. 6A and 6B are diagrams for describing the image encoding process of this embodiment. FIG. 6A shows an example of the image encoding process of this embodiment, and FIG. 6B shows an example conventional image encoding process to which this embodiment is not applied.

Here, it is assumed that the pixel-value-to-be-processed input section 301 successively receives pixel data having a fixed bit length (N bits). It is also assumed that the data amount of the pixel data received by the pixel-value-to-be-processed input section 301 is 10 bits (N=10). In other words, it is assumed that the dynamic range of the pixel data is 10 bit. Here, it is assumed that the bit length M of the quantized value is 7 bits. The packing section 305 packs received data into S bits, and outputs the packed data from the image encoding device 300 to external circuitry. It is assumed that the fixed bit length S is set to 48 bits. Here, it is assumed that the number Pix_G of pixels included in each group is, for example, "5."

FIG. 6A shows, as an example, pixel data of six pixels to be encoded (the pixel data of a pixel to be encoded is hereinafter referred to as "pixel data to be encoded") input to the pixel-value-to-be-processed input section 301. It is assumed that 10-bit pixel data corresponding to each of pixels P1, P2, . . . , and P6 is input to the pixel-value-to-be-processed input section 301 in the order of P1, P2, . . . , and P6. Numerical values (150 etc.) shown in the pixels P1-P6 each indicate a signal level indicated by pixel data thereof. Note that it is assumed that pixel data corresponding to the pixel P1 is a leading pixel to be encoded, and the pixel value of the pixel P1 is an initial pixel value.

In this embodiment, it is assumed that, as an example, a predicted value for a pixel to be encoded is calculated by the predicted pixel generator 302 based on the prediction expression (1). In this case, the calculated predicted value for a pixel to be encoded is the value of a pixel which is left adjacent to that pixel to be encoded ("a" in FIG. 5). In other words, the predicted pixel generator 302 predicts that it is highly likely that a pixel to be encoded has the same pixel value (signal level) as that of the immediately previous input pixel.

In the image encoding process of FIG. 2, initially, step S101 is performed. In step S101, the pixel-value-to-be-processed input section 301 determines whether or not input pixel data to be encoded is an initial pixel value. If the determination result in step S101 is positive (YES), the pixel-value-to-be-processed input section 301 stores the received pixel data to an internal buffer, and transmits the input pixel data to the packing section 305. Thereafter, control proceeds to step S109 described below. On the other hand, if the determination result in step S101 is negative (NO), control proceeds to step S102.

Here, it is assumed that the pixel-value-to-be-processed input section 301 has received pixel data corresponding to the pixel P1 as an initial pixel value. In this case, the pixel-value-to-be-processed input section 301 stores the input pixel data to the internal buffer, and transmits the received pixel data to the packing section 305. Note that when pixel data is already stored in the buffer, the pixel-value-to-be-processed input section 301 overwrites that pixel data in the internal buffer with the received pixel data.

Here, it is assumed that the pixel P2 is a pixel to be encoded. In this case, it is assumed that the pixel-value-to-be-processed input section 301 has received pixel data to be encoded corresponding to the pixel P2. It is assumed that a pixel value indicated by the pixel data to be encoded is "1023" (see FIG. 6A). In this case, the received pixel data is not an initial pixel value (NO in step S101), the pixel-value-to-be-processed input section 301 transmits the received pixel data to the difference value calculator 303.

If the determination result in step S101 is negative (NO), the pixel-value-to-be-processed input section 301 transmits the pixel data stored in the internal buffer to the predicted pixel generator 302. Here, it is assumed that the transmitted pixel data indicates the pixel value "150" of the pixel P1.

The pixel-value-to-be-processed input section 301 also overwrites the pixel data in the internal buffer with the received pixel data. Thereafter, control proceeds to step S102.

In step S102, the predicted pixel generator 302 calculates a predicted value for the pixel to be encoded. Specifically, as described above, the predicted pixel generator 302 calculates the predicted value, for example, using the prediction expression (1). In this case, the pixel value ("150") of the pixel P1 received from the pixel-value-to-be-processed input section 301 by the predicted pixel generator 302 is calculated as the predicted value. The predicted pixel generator 302 transmits the calculated predicted value "150" to the difference value calculator 303.

In step S103, the difference value calculator 303 performs a difference value calculation process. Specifically, the difference value calculator 303 subtracts the predicted value received from the predicted pixel generator 302, from the pixel data to be encoded received from the pixel-value-to-be-processed input section 301 to calculate a difference value D. Here, it is assumed that the pixel value of the received pixel data to be encoded is "1023," and the predicted value is "150." By subtracting the predicted value ("150") from the pixel data to be encoded ("1023"), the difference value D is calculated as "873." The difference value calculator 303 also transmits the calculated difference value D to the quantization processor 304 and the quantization width determiner 306.

In step S104, the quantization width determiner 306 calculates a unit quantization width Q for each input pixel. The quantization width determiner 306 calculates a value obtained by adding one to the number of digits of a binary code representing the absolute value of the difference value D, i.e., the number of bits of the difference value D. Thereafter, a value obtained by subtracting the bit length M of the quantized value from the number of bits of the difference value D is calculated as the unit quantization width Q. Here, it is assumed that the difference value D is "873." The absolute difference value is "873," and the number of bits thereof is 10 bits. When it is assumed that the bit length M is 7 bits, Q=10+1−7, i.e., the unit quantization width Q of the pixel P2 is "4." Note that Q is a positive integer, and therefore, it is assumed that when the number of bits of the difference value is smaller than the bit length M of the quantized value, Q is zero. The quantization width determiner 306 transmits the calculated unit quantization width Q to the initial quantization width calculator 307, the edge portion quantization width calculator 308, the edge determiner 309, and the edge pixel determiner 310 in the quantization width determiner 306.

In step S105, the quantization width determiner 306 determines whether or not a unit quantization width Q has been determined for pixel data of all Pix_G pixels included in a group. Here, it is assumed that a pixel of interest to be encoded is the pixel P2, and the number Pix_G of pixels is "5." In this case, the determination result in step S105 is negative (NO), and control proceeds to step S102. Next, steps S102-S104 are executed on the pixel data of a pixel (P3) received by the pixel-value-to-be-processed input section 301. When a unit quantization width Q has been determined for all the input pixels P1-P6, the determination result in step S105 is positive (YES), and control proceeds to step S106.

In step S106, in the quantization width determiner 306, the quantization width selector 311 selects a quantization width corresponding to a pixel to be encoded from the initial quantization width, the edge portion quantization width and the flat portion quantization width, based on information indicating the presence or absence of an edge and the edge flag.

In step S106, initially, step S201 is performed. In step S201, the initial quantization width calculator 307 calculates the largest quantization width Q_MAX of Pix_G unit quantization widths Q corresponding to Pix_G pixels in a group. In FIG. 6A, the unit quantization widths Q of the pixels to be encoded are "4," "4," "0," "0" and "0," and therefore, the largest quantization width Q_MAX is "4." Here, the quantization width determiner 306 sets the calculated largest quantization width Q_MAX to an initial quantization width which is a common quantization width for all pixels in a group. In other words, all pixels to be encoded in a group have the largest quantization width Q_MAX as the initial quantization width.

Next, in step S202, the edge portion quantization width calculator 308 calculates an edge portion quantization width which is a quantization width used in the edge portion quantization process and a flat portion quantization width which is a quantization width used in the flat portion quantization process. The edge portion quantization width is a quantization width obtained by adding one to the initial quantization width. Here, the initial quantization width is "4," and therefore, the edge portion quantization width is "5."

On the other hand, the flat portion quantization width is a quantization width used in the flat portion quantization process, i.e., a quantization width used in a quantization process for pixels to be encoded other than edge pixels. The edge pixel determiner 310 determines whether or not a pixel to be encoded is an edge pixel, by a process described below. In this case, the edge pixel determiner 310 determines that a pixel to be encoded is an edge pixel, if the value of the unit quantization width Q is larger than or equal to the predetermined threshold (fourth threshold) TH2. The flat portion quantization width is set to be smaller than the initial quantization width in order to reduce a quantization error in a region other than edge pixels. For example, the flat portion quantization width is set to "2."

In step S203, the edge determiner 309 determines whether or not a picture in a group has both a flat portion and an edge portion. The edge determiner 309 calculates a difference between the largest quantization width Q_MAX and the smallest quantization width Q_MIN of Pix_G unit quantization widths Q in the group, and if the difference is larger than or equal to the predetermined threshold (first threshold) TH1, determines that the picture in the group of interest has both a flat region and an edge. Here, it is assumed that the largest quantization width Q_MAX in the group is "4," and the smallest quantization width Q_MIN in the group is "0." It is also assumed that the threshold TH1 for determining an edge is "3." In this case, the difference between the largest quantization width Q_MAX and the smallest quantization width Q_MIN is calculated as Q_MAX−Q_MIN=4−0=4. If the difference is compared to the threshold TH1, 4≥3 is established, and therefore, it can be determined that the picture in the group of interest has both a flat region and an edge.

Note that, as a technique of determining whether or not there are both a flat portion and an edge portion, a threshold (second threshold) TH3 and a threshold (third threshold) TH4 corresponding to the largest quantization width Q_MAX and the smallest quantization width Q_MIN, respectively, in a group may be previously set. Here, the threshold TH3 is a threshold of the difference value D for defining an edge portion, and the threshold TH4 is a threshold of the difference value D for defining a flat portion. Therefore, if the largest quantization width Q_MAX is larger than or equal to the threshold TH3 and the smallest quantization width Q_MIN is smaller than or equal to the threshold TH4, it can be determined that there are both a flat portion and an edge portion.

After the end of the edge determination process, the edge determiner 309 transmits information about the presence or absence of an edge to the quantization width selector 311.

In step S204, the edge pixel determiner 310 determines whether or not a pixel of interest to be encoded is an edge pixel. If the value of the unit quantization width Q is larger than or equal to the predetermined threshold TH2, the edge pixel determiner 310 determines that the pixel of interest to be encoded is an edge pixel, and transmits the determination result as an edge flag to the quantization width selector 311. It is assumed that the edge flag is set to "1" if a pixel of interest to be encoded is an edge pixel, and "0" otherwise. Here, it is assumed that the value of the threshold TH2 is "2." In FIG. 6A, the unit quantization widths Q for the pixels P2-P6 are "4," "4," "0," "0" and "0." These unit quantization widths Q are compared to "2" which is the value of the threshold TH2, so that pixels to be encoded whose unit quantization widths Q are larger than or equal to the threshold TH2 are determined as an edge pixel, and the values of the edge flags are set to "1," "1," "0," "0" and "0."

Note that that it is determined that a pixel of interest to be encoded is an edge pixel if the value of the unit quantization width Q is larger than or equal to the predetermined threshold TH2, is equivalent to that it is determined that there is a steep edge in a pixel to be encoded in which the bit length of the difference value between the pixel value and the predicted value is larger than or equal to a predetermined value, i.e., a pixel to be ended having a predetermined difference value or more. After the edge pixel determiner 310 has transmitted the calculated edge flags to the quantization width selector 311, control proceeds to step S205.

Note that if a unit quantization width Q has been calculated for all pixels to be encoded in a group, steps S201-S204 can be executed. Therefore, after all unit quantization widths Q have been input to the initial quantization width calculator 307, the edge portion quantization width calculator 308, the edge determiner 309 and the edge pixel determiner 310, steps S201-S204 may be performed in parallel.

In step S205, based on the determination result of the edge determiner 309 in step S203, it is determined whether or not a picture in a group to which a pixel to be encoded belongs has both a flat portion and an edge portion.

Here, it is assumed that the pixel of interest to be encoded is the pixel P2. It is assumed that the quantization width selector 311 has received an initial quantization width of "4," an edge portion quantization width of "5," and a flat portion quantization width of "2." It is also assumed that the edge determiner 309 determines that the picture in the group to which the pixel to be encoded belongs has both a flat portion and an edge portion. It is also assumed that the value of an edge flag received from the edge pixel determiner 310 by the quantization width selector 311 is "1."

In the quantization width determination process (see FIG. 4), it is determined that the picture in the group to which the pixel to be encoded belongs has both a flat portion and an edge portion. Therefore, the determination result in step S205 is positive (YES), control proceeds to step S207. In step S207, because the value of the edge flag is "1," the determination result is positive (YES), and control proceeds to step S208. In step S208, the quantization width of "5" which is an edge portion quantization width is selected as a quantization width corresponding to the pixel to be encoded. Thereafter, the quantization width determination process for the pixel P2 is ended.

In step S107, the quantization processor 304 quantizes a difference value D received from the difference value calculator 303 based on a quantization width determined by the quantization width selector 311. In the quantization process, the difference value D is shifted downward (toward the least significant bit) by the number of bits corresponding to a quantization width Q_Fixed, which is equivalent to a process of dividing the difference value D by two raised to the power of Q_Fixed, where Q_Fixed is the quantization width received from the quantization width selector 311 by the quantization processor 304. Here, it is assumed that the difference value D is "873," and the quantization width is "5." In this case, in the quantization process, the quantization processor 304 divides "873" by two raised to the power of five to obtain a quantized value of "5."

Note that if the quantization process is performed, for example, using a bit shifter, the circuit size of the image encoding device 300 can be reduced.

Here, if a quantization error occurs due to the quantization process of the quantization processor 304, the image encoding process and the image decoding process may not have the same predicted value, leading to a degradation in image quality. Therefore, in step S107, when the quantization processor 304 executes the quantization process, a predicted value may be calculated again by the predicted pixel generation process (step S102 of FIG. 2) of the predicted pixel generator 302, and a difference value to be encoded may be obtained again. Specifically, when a predicted value for an h-th pixel to be encoded is calculated, then if (h−1)th pixel data is an initial pixel value, a value itself indicated by the (h−1)th pixel data is used as the predicted value. On the other hand, if the (h−1)th pixel data is not an initial pixel value, the (h−1)th data may be temporarily encoded by the image encoding device 300, the resulting data may be input to and decoded by an image decoding device described below, and a pixel value indicated by the resulting pixel data may be used as the predicted value. As a result, even if a quantization error occurs due to the quantization process of the quantization processor 304, the image encoding process and the image decoding process can have the same predicted value, whereby a degradation in image quality can be reduced.

It is assumed that, in FIG. 6A, a difference value which is obtained when pixel data obtained by the image decoding process is defined as a predicted value in the predicted pixel generator 302 is defined as a value to be compressed, and is transmitted to the quantization processor 304. Specifically, the value to be compressed of FIG. 6A is a value on which the quantization processor 304 executes the quantization process in step S107, and is equal to a difference value between the decoding result and the input value (pixel data to be encoded).

Next, in step S108, it is determined whether or not the quantization process has been completed for all Pix_G pixels in a group. Here, it is assumed that a pixel of interest to be encoded is the pixel P2. The determination result in step S108 is negative (NO), and control proceeds to step S107. A process following this is an image encoding process on the pixel P3, which is similar to that described above, and therefore, will not be described in detail.

In the quantization width determination process on the pixel P4, the same initial quantization width, edge portion quantization width, flat portion quantization width, and edge presence/absence information, which are common in the group, are used. However, it is assumed that the value of the edge flag received from the edge pixel determiner 310 by the quantization width selector 311 is "0." In step S205, it is determined that there are both a flat portion and an edge portion, i.e., the determination result is positive (YES), and therefore, control proceeds to step S207. In step S207, because the value of the edge flag is "0," the determination result is negative (NO), and therefore, control proceeds to step S209. In step S209, a quantization width of "2" which is a flat portion quantization width is selected as a quantization width corresponding to the pixel to be encoded. Thereafter, the quantization width determination process for the pixel P4 is ended.

By repeatedly executing a similar process on each of Pix_G pixels to be encoded in a group, the quantization width determiner 306 determines a quantization width corresponding to each pixel to be encoded, and the quantization processor 304 executes the quantization process.

In step S109, the packing section 305 inserts a 1-bit edge flag into the quantized value if the edge determiner 309 determines that there are both a flat portion and an edge portion. Thereafter, the packing section 305 combines and packs the initial pixel value of at least one pixel, a plurality of quantized values, and at least one portion of quantization information into S bits. Moreover, the packing section 305 encodes information about the quantization width received form the quantization width determiner 306 to generate J-bit quantization information.

Figure 7A:
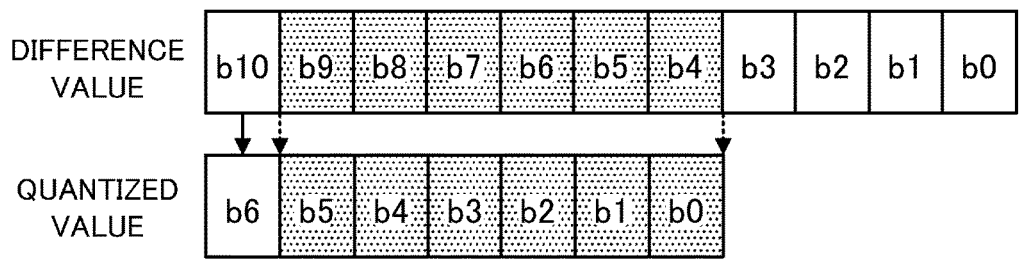
FIG. 7A is a diagram showing a schematic bit arrangement of a difference value and a quantized value for a pixel to be encoded for which it is determined that there are not both a flat portion and an edge portion in the same group, in the image encoding process.
Figure 7B:
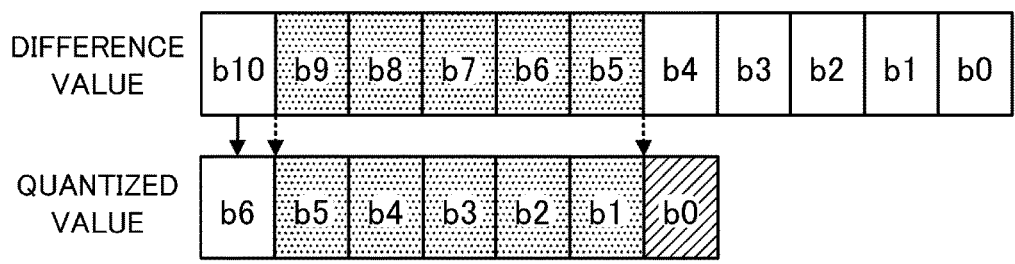
FIG. 7B is a diagram showing a schematic bit arrangement for an edge pixel.
Figure 7C:
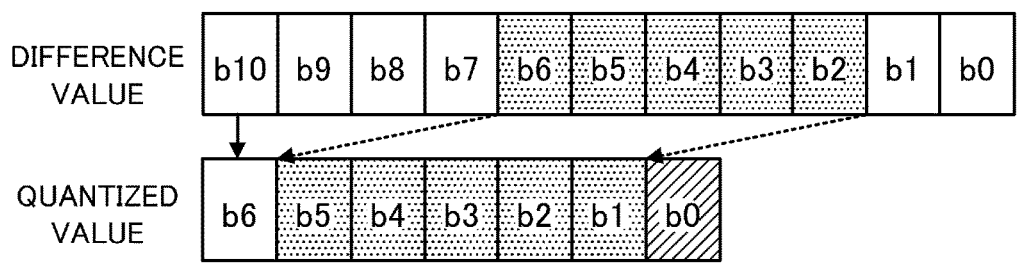
FIG. 7C is a diagram showing a schematic bit arrangement for a pixel other than edge pixels.

Here, an example quantized value packed by the packing section 305 will be described with reference to FIGS. 7A-7C. FIGS. 7A-7C are diagrams showing schematic bit arrangements of a difference value D and a quantized value in the image encoding process of this embodiment. FIGS. 7A-7C show to what bit positions the bit data of a difference value D is stored as the bit data of a quantized value by the quantization process executed by the quantization processor 304. FIG. 7A shows a schematic bit arrangement of a difference value D and a quantized value corresponding to a pixel to be encoded when the edge determiner 309 determines that there are not both a flat portion and an edge portion in the same group. FIG. 7B shows a schematic bit arrangement of an edge pixel of this embodiment. FIG. 7C shows a schematic bit arrangement of a pixel other than edge pixels of this embodiment.

Here, the bit length N of pixel data input to the pixel-value-to-be-processed input section 301 is 10 bits, and therefore, the number (bit length) of bits required for signed integer binary representation of the difference value D is 11 bits. In FIGS. 7A-7C, it is assumed that the most significant bit ("b10") of the 11-bit difference value D is bit data indicating a positive or negative sign. It is also assumed that the bit length M of the quantized value is 7 bits, and the most significant bit ("b6") of the quantized value in FIGS. 7A-7C stores bit data indicating the positive or negative sign of the difference value D. In other words, information about the most significant bit ("b10") of the difference value D is stored directly to the most significant bit ("b6") of the quantized value. Specifically, for example, if the difference value calculator 303 subtracts a predicted value from pixel data to be encoded to obtain a positive difference value D, the quantization processor 304 sets the most significant bit of the quantized value to "0," and otherwise, to "1."

Here, it is assumed that the difference value between the predicted value and the pixel data to be encoded is large, and therefore, 10 bits are required for representation of the absolute difference value. If the edge determiner 309 determines that there are not both a flat portion and an edge portion, bit data b4-b9 of the difference value D is stored to bits b0-b5 of the quantized value (see FIG. 7A). Four bits (i.e., bit data b0-b3) are removed, because the quantization processor 304 performs the quantization process based on the initial quantization width ("4").

In this embodiment, if the edge determiner 309 determines that there are both a flat portion and an edge portion, the bit data b5-b9 of the difference value D is stored to the bits b1-b5 of the quantized value for an edge pixel (see FIG. 7B). This corresponds to that the quantization processor 304 has performed the quantization process based on the edge portion quantization width ("5"). Here, the bit b0 stores the edge flag which is determined by the edge pixel determiner 310. In other words, of M-bit bit data obtained by encoding the quantized value, the number (bit length) of bits in which information about the difference value D can be stored is (M−1) bits.

On the other hand, in this embodiment, if the edge determiner 309 determines that there are both a flat portion and an edge portion, as shown in FIG. 7C the bit data b2-b6 of the difference value D is stored to the bits b1-b5 of the quantized value for pixels other than edge pixels. This corresponds to that the quantization processor 304 has performed the quantization process based on the flat portion quantization width ("2"). For pixels other than edge pixels, similar to edge pixels, it is necessary to store the edge flag to the bit b0, and therefore, of the quantized value, the number (bit length) of bits in which information about the difference value D can be stored is (M−1) bits.

Here, it is assumed that the threshold of a unit quantization width Q which is used when the edge pixel determiner 310 determines whether or not a pixel to be encoded is an edge pixel is TH2. As described above, if the edge determiner 309 determines that there are both a flat portion and an edge portion, the number (bit length) of bits of the quantized value in which information about the difference value D can be stored is (M−1) bits. Therefore, this is equivalent to that the edge pixel determiner 310 determines that a pixel to be encoded is an edge pixel if the bit length of the difference value D is larger than or equal to a bit length L obtained by:

$$L = (TH2 + (M-1)) \quad (8)$$

In other words, if the bit length of the difference value D is larger than or equal to L bits, the quantization process is performed on the pixel data to be encoded using the edge portion quantization width as shown in FIG. 7B. If the bit length of the difference value D is smaller than L bits, it is determined that the pixel data to be encoded is not an edge pixel, and the quantization process is performed on the pixel data to be encoded using the flat portion quantization width as shown in FIG. 7C.

The flat portion quantization width is a quantization width for reducing a quantization error in a flat region, and therefore, is desirably set to as small a value as possible. However, as indicated by the expression (8), a threshold used when it is determined whether or not a pixel to be encoded is an edge pixel is derived from the threshold TH2. Therefore, according to the expression (8), if the threshold TH2 is set to a value which causes the bit length L to be extremely small, the threshold for determining an edge pixel is lowered. As a result, if a pixel to be encoded is an edge pixel, most of the pixel data to be encoded is likely to be lost.

Here, it is assumed that the value of the threshold TH2 is "2." Because the bit length M of the quantized value is 7 bits, TH2+(M−1)=8 according to the expression (8). If the bit length of the difference value D is smaller than 8 bits, the quantization process is performed using the flat portion quantization width. Therefore, the maximum bit length of the difference value D which satisfies the condition for selection of the quantization process using the flat portion quantization width, is 7 bits. Therefore, for pixels other than edge pixels, the bit data of the 1st to 7th bits of the difference value D needs to be stored as the quantized value, and therefore, as shown in FIG. 7C, the bit data b2-b6 of the difference value D is stored to the bits b1-b5 of the quantized value. The value of the flat portion quantization width in this case has the same value ("2") as that of the threshold TH2.

The bit data of the quantized values of FIGS. 7A and 7B is compared. For an edge pixel of this embodiment, one bit is allocated as the flag bit, and therefore, the quantization width can take a larger value than when there are not both a flat portion and an edge portion. However, a picture itself as it was when an image of a subject was captured has changed, it is difficult to visually recognize a change in level of a local edge portion as a quantization error.

It is assumed that the subject itself has not changed, and there is an extremely large difference between a defective pixel and an adjacent pixel in a region including the defective pixel of the imaging element. Typically, a signal processing device which performs image signal processing on a captured image signal input from the imaging element includes a circuit for correcting a defective pixel. Therefore, even if an edge pixel (defective pixel) is significantly degraded due to the quantization process, the signal processing device can correct the edge pixel into an appropriate pixel value using an adjacent pixel having a less quantization error.

Moreover, as can be clearly seen by comparing the bit data of the quantized values of FIGS. 7A and 7C, quantization widths for pixels to be encoded other than edge pixels are set to be lower. Therefore, it is possible to reduce a degradation in image quality of a flat portion, which is easily visually perceived as a significant one when the quantization process has been performed thereon.

Next, example quantization information which is generated by the packing section 305 is shown in FIG. 8. Here, it is assumed that the bit length J of the quantization information is "3." FIG. 8 is a diagram showing correspondence between bit lengths required for signed integer binary representation of the difference value D, determination results obtained by the edge determiner 309, and 3-bit quantization information determined based on the quantization width. In FIG. 8, the determination result obtained by the edge determiner 309 is "1" if it is determined that there are both a flat portion and an edge portion, and "0" otherwise. For example, if the edge determiner 309 determines that there are both a flat portion and an edge portion, the packing section 305 generates "101" as quantization information based on FIG. 8. It is assumed that the edge determiner 309 determines that there are not both a flat portion and an edge portion, and the quantization width received from the quantization width determiner 306 is "3." In this case, the packing section 305 generates "011" as quantization information based on FIG. 8.

In the packing process of step S109, the packing section 305 stores the pixel data of the pixel P1 which is an initial pixel value received from the pixel-value-to-be-processed input section 301, to a buffer memory having a bit length of S bits. Thereafter, a quantization width received from the quantization width determiner 306, J-bit quantization information obtained by encoding edge presence/absence information obtained by the edge determiner 309, and a quantized value for the pixel P2 to be encoded received from the quantization processor 304, are sequentially stored to the buffer memory. Here, it is assumed that the fixed bit length S is "48," the bit length N of the input pixel data to be encoded is "10," and the bit length J of the quantization information is "3." Because the bit length M of the quantized value is 7 bits, encoded data of 20 bits from the head of the 48-bit buffer memory is stored. After the end of the packing process for the pixel to be encoded, control proceeds to step S110.

In step S110, it is determined whether or not the image encoding process has been completed for Pix pixels which are to be packed into S bits. Here, it is assumed that Pix is previously calculated.

Here, when the fixed bit length S is "48," the bit length N of the input pixel data to be encoded is "10," the bit length J of the quantization information is "3," and the quantized value has a length of 7 bits, then if Pix is 6 pixels, packing into S bits is allowed. Note that this indicates that the S-bit packed data contains the initial pixel value of one pixel and one group of five pixels to be encoded. Note that the number of groups in the S bits may not be limited to one group.

If the determination result in step S110 is negative (NO), control proceeds to step S101, and at least one of steps S101-S109 is executed on the next pixel data to be encoded received by the pixel-value-to-be-processed input section 301. Steps S101-S109 are repeatedly performed on the pixels P3-P6, and the resulting data is successively stored to the buffer memory.

On the other hand, if the determination result in step S110 is positive (YES), encoded data in the buffer memory is output in groups of S bits from the image encoding device 300, and control proceeds to step S111.

In step S111, based on the output encoded data, it is determined whether or not the encoding process has been completed for one image, and if the determination result is positive (YES), the encoding process is ended, and if the determination result is negative (NO), control proceeds to step S101, and at least one of steps S101-S110 is executed.

The results of the above processes and calculations, i.e., the results of the calculations of the pixels P1-P6 to be encoded, the 7-bit quantized values packed by the packing section 305, errors between the results of the decoding and the input values (pixel data to be encoded), are shown in FIG. 6A.

FIG. 9A shows a schematic bit arrangement of S-bit packed data which is obtained when it is assumed that the image encoding process is not adaptive, i.e., the quantization width is always "0." Note that the schematic bit arrangement is not one that is actually generated by the image encoding device 300. FIG. 9B shows a schematic bit arrangement which is obtained when the image encoding process is adaptive, and is actually stored to the buffer memory by the packing section 305, and is output from the image encoding device 300.

FIG. 9B shows that the left 10 bits indicate that the pixel P1 which is the first input pixel and has a length of N ("10") bits is input as an initial pixel value to the packing section 305. Thereafter, the first 10-bit data is followed by J ("3")-bit quantization information, and M ("7")-bit encoded data of quantized values for the following pixels P2-P6. Because the pixels P2-P6 are encoded, the number of pixels which can be stored in the same bit length S increases.

If the bus width for data transfer in the integrated circuit which is employed is set to the bit length S of data packed by the packing section 305, the number of pixels which can be transferred at one time increases, and the fixed bus width can be ensured. Therefore, when there is a request to access certain compressed pixel data, it is only necessary to access packed data which has been packed on a bus width-by-bus width basis. In this case, if the bus width is not equal to the bit length of packed data, i.e., there is an unused bit(s), the unused bit may be replaced with dummy data as shown in FIG. 9A.

FIG. 6B shows an example conventional image encoding process in which this embodiment is not carried out. In the conventional image encoding process, as in this embodiment, steps S101-S105 are executed. In step S106, for each group including Pix_G pixels, the initial quantization width calculator 307 determines, as an initial quantization width, a common quantization width which is used in quantization of every pixel to be encoded in the group (step S201 of FIG. 4). In the conventional image encoding process, the initial quantization width obtained in step S201 is a group's common quantization width, and all pixels to be encoded belonging to the group are quantized using the initial quantization width. Therefore, in the conventional image encoding process, when step S201 is completed, step (quantization width determination step) S106 is ended, and control proceeds to step S107.

In the conventional image encoding process, because all pixels to be encoded belonging to a group are quantized using the initial quantization width, the quantization process using a quantization width of "4" is performed on a flat region having a less change in the signal level of a pixel (e.g., the pixels P4-P6). The results of processes and calculations on the pixels P1-P6 to be encoded, quantized values, and errors between the results of decoding and input values (pixel data to be encoded), in this case, are shown in FIG. 6B. As can be clearly seen from comparison to the results of decoding and the errors between the results of decoding and the input values (pixel data to be encoded) of FIG. 6A, there are larger errors in the flat region of the pixels P4-P6. Specifically, in the conventional image encoding process (FIG. 6B) in which this embodiment is not carried out, in the flat region of the pixels P4-P6, errors "−4," "−5" and "8" occur due to an influence of the quantization process employing the large quantization width. In contrast to this, in the case (FIG. 6A) in which this embodiment is carried out, the quantization width is reduced, whereby the occurrence of an error can be reduced (specifically, "0," "−1" and "0").

Note that, in this embodiment, the image encoding process is performed using a predictive encoding technique employing the prediction expression (1), and a difference value is calculated by subtracting a predicted value received from the predicted pixel generator 302, from pixel data to be encoded received from the pixel-value-to-be-processed input section 301. However, the present disclosure is not limited to this encoding process. Alternatively, a predicted value approximate to the pixel value of pixel data of interest to be encoded may be obtained, a value indicating a difference from the predicted value may be calculated, and that value may be caused to be a target to be quantized and may be quantized in the quantization process. This technique is, of course, applicable to the present disclosure.

Thus, when there are both a flat portion and an edge portion, even the image quality of a flat portion, in which a degradation would be visually noticeable, is degraded in the conventional image encoding process, while the degradation in the flat portion can be reduced by the image encoding process of this embodiment.

Therefore, according to this embodiment, even when there are both a flat portion and an edge portion (e.g., a defective pixel or a steep edge occurs in a relatively flat region), then if quantization widths used in the quantization process are adaptively changed on a pixel-by-pixel basis, the degree of a degradation in the image quality of a flat portion, in which a degradation would be visually noticeable, can be reduced while random accessibility is maintained.

<Image Decoding Process>

A process (hereinafter referred to as an "image decoding process") of decoding encoded data which is performed by an image decoding device 110 will be described hereinafter with reference to FIGS. 10 and 11.

Figure 10:
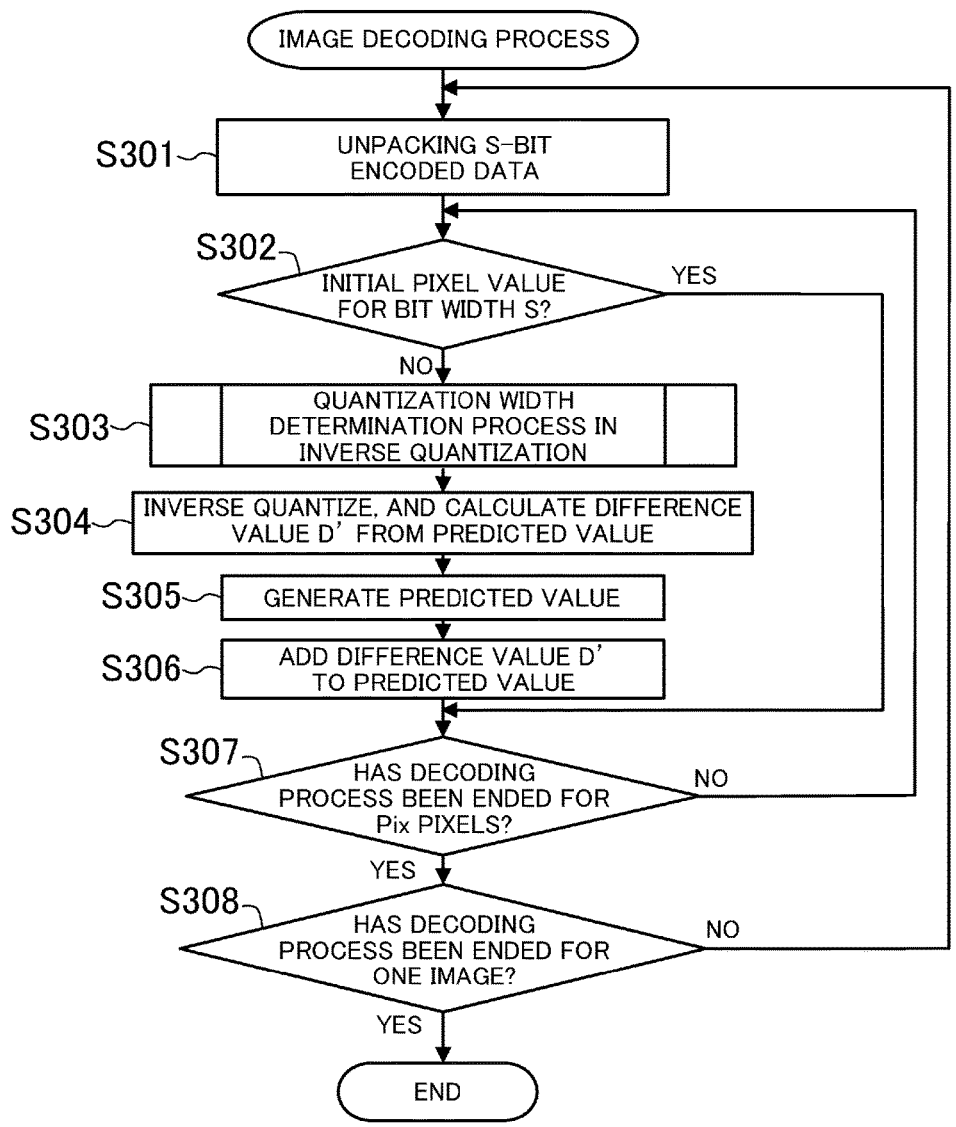
FIG. 10 is a flowchart showing an image decoding process in the first embodiment.

FIG. 10 is a flowchart of the image decoding process in the first embodiment of the present disclosure. FIG. 11 is a block diagram showing a configuration of the image decoding device 110 in the first embodiment of the present disclosure.

For example, encoded data input to an unpacking section 111 is one which is required for decoding of the pixels P1-P6 of FIG. 6A. The unpacking section 111 analyzes S-bit fixed-length encoding data transmitted from the packing section 305 or a memory (e.g., an SDRAM etc.), and separates the fixed-length encoding data into a plurality of portions of data. Specifically, the unpacking section 111 separates the received fixed-length encoding data into an N-bit initial pixel value, or J-bit quantization information containing information about a quantization width, an M-bit quantized value corresponding to a pixel to be decoded (step S301 of FIG. 10).

The encoded data analyzed by the unpacking section 111 is transmitted to a quantization width determiner 112 and an output section 116 with appropriate timing. When the encoded data of interest is input as an initial pixel value (YES in step S302 of FIG. 10), the encoded data is transmitted as pixel data holding the N-bit dynamic range as it was before encoding. Therefore, the unpacking section 111 transmits the encoded data of interest to the output section 116 directly without an inverse quantization process.

When the encoded data of interest is not an initial pixel value (NO in step S302 of FIG. 10), the unpacking section 111 transmits J-bit encoded data containing quantization information or M-bit encoded data containing a quantized value to the quantization width determiner 112, and control proceeds to a quantization width determination process in an inverse quantization process (step S303 of FIG. 10).

In step (quantization width determination step) S303, in the quantization width determiner 112, a quantization width selector 119 determines a quantization width for the inverse quantization process on a pixel-by-pixel basis based on the result of analysis by a quantization information analyzer 117 and an edge flag extracted by an edge flag extractor 118, and outputs the quantization width along a corresponding quantized value to an inverse quantization processor 113. Thereafter, control proceeds to the inverse quantization process.

FIG. 20 is a flowchart showing a method for determining a quantization width used in the inverse quantization process (specifically, details of step S303). The quantization width determination process in the inverse quantization process of step S303 will be described with reference to FIG. 20.

Initially, when encoded data received from the unpacking section 111 by the quantization width determiner 112 is J-bit quantization information (YES in step S401 of FIG. 20), the quantization width determiner 112 analyzes information about a quantization width used in the inverse quantization process based on the encoded data received from the unpacking section 111 (step S402 of FIG. 20). Specifically, the quantization information analyzer 117 in the quantization width determiner 112 analyzes J-bit quantization information generated by the packing section 305 in the image encoding process performed by the image encoding device 300. By the analysis process, the determination result of the edge determiner 309 and the information about a quantization width used in the quantization process performed by the quantization processor 304, are extracted. Based on the analysis result, the quantization information analyzer 117 transmits the edge presence/absence determination result of the edge determiner 309 to the edge flag extractor 118, and information about the quantization width to the quantization width selector 119.

On the other hand, when the encoded data received from the unpacking section 111 is M-bit encoded data containing a quantized value (NO in step S401 of FIG. 20), the quantization width determiner 112 determines whether or not a picture in a group to which a pixel of interest to be decoded belongs has both a flat portion and an edge portion, based on the result of the above-described analysis in step S402 by the quantization information analyzer 117 (step S403 of FIG. 20). When the picture in the group to which the pixel of interest to be decoded belongs has both a flat portion and an edge portion (YES in step S403 of FIG. 20), the edge flag extractor 118 extracts an edge flag contained in the quantized value corresponding to the pixel to be decoded received from the unpacking section 111. After the end of the extraction process, the edge flag extractor 118 transmits information about the extracted edge flag to the quantization width selector 119, and information about the quantized value to an inverse quantization processor (inverse quantizer) 113 (step S405 of FIG. 20).

When receiving the edge flag, the quantization width selector 119 determines whether or not the pixel of interest to be decoded is an edge pixel, based on that information (step S406 of FIG. 20). If, based on the edge flag, it is determined that the pixel of interest to be decoded is an edge pixel, control proceeds to step S407.

In step S407, because the pixel of interest to be decoded is an edge pixel, an edge portion quantization width is selected as a corresponding quantization width from the analysis result of the quantization information analyzer 117. If the determination result in step S406 is negative (NO), control proceeds to step S408.

In step S408, based on the analysis result of the quantization information analyzer 117 and the edge flag information received from the edge flag extractor 118, it can be determined that the pixel of interest to be decoded is a flat portion close to an edge, and therefore, a flat portion quantization width is selected as a corresponding quantization width.

In step S403, if the determination result is negative (NO), the quantization width selector 119 can determine that the picture in the group to which the pixel to be decoded belongs is a generally flat or complicated picture, and therefore, a quantization width corresponding to all pixels to be decoded in the group is set to the initial quantization width obtained based on the analysis result of the quantization information analyzer 117. In this case, the edge flag extractor 118 transmits a quantized value received from the unpacking section 111 to the inverse quantization processor 113 directly without any process.

After a quantization width has been determined for all pixels to be decoded, the quantization width determination process in the inverse quantization process is ended, and control proceeds to the inverse quantization process.

In the inverse quantization process, the inverse quantization processor 113 receives M-bit encoded data containing a quantization width and a quantized value transmitted from the quantization width determiner 112, and performs the inverse quantization process based on the received quantization width. The inverse quantization process based on a quantization width is to shift M-bit encoded data indicating the quantized value received from the quantization width determiner 112 upward (toward the most significant bit) by the number of bits corresponding to the quantization width. The inverse quantization processor 113 calculates, by the inverse quantization process, a difference value D' in pixel value between a pixel to be decoded represented by N bits and a predicted pixel thereof. Note that when the quantization width is "0," the inverse quantization processor 113 does not perform inverse quantization (step (inverse quantization step) S304 of FIG. 10).

In step (predicted pixel generation step) S305, a predicted pixel generator 114 calculates a predicted value corresponding to a pixel to be decoded. Data input to the predicted pixel generator 114 is either an initial pixel value which has been input prior to the pixel of interest to be decoded and output from the output section 116 or pixel data which has been previously decoded and output from the output section 116. The predicted pixel generator 114 generates a predicted value represented by N bits using the input pixel data. The predicted value is generated based on one of the prediction expressions (1)-(7). The predicted pixel generator 114 calculates the predicted value using a prediction expression similar to that used in the predicted pixel generator 302 of the image encoding device 300. The predicted pixel generator 114 transmits the calculated predicted value to a decoded value generator 115.

In step S306, the decoded value generator 115 adds the inverse quantization result received from the inverse quantization processor 113 with the predicted value corresponding to the pixel to be decoded received from the predicted pixel generator 114 to generate a decoded value corresponding to the pixel to be decoded, and transmits the decoded value to the output section 116.

Next, the image decoding process in this embodiment will be described in detail.

Figure 12:
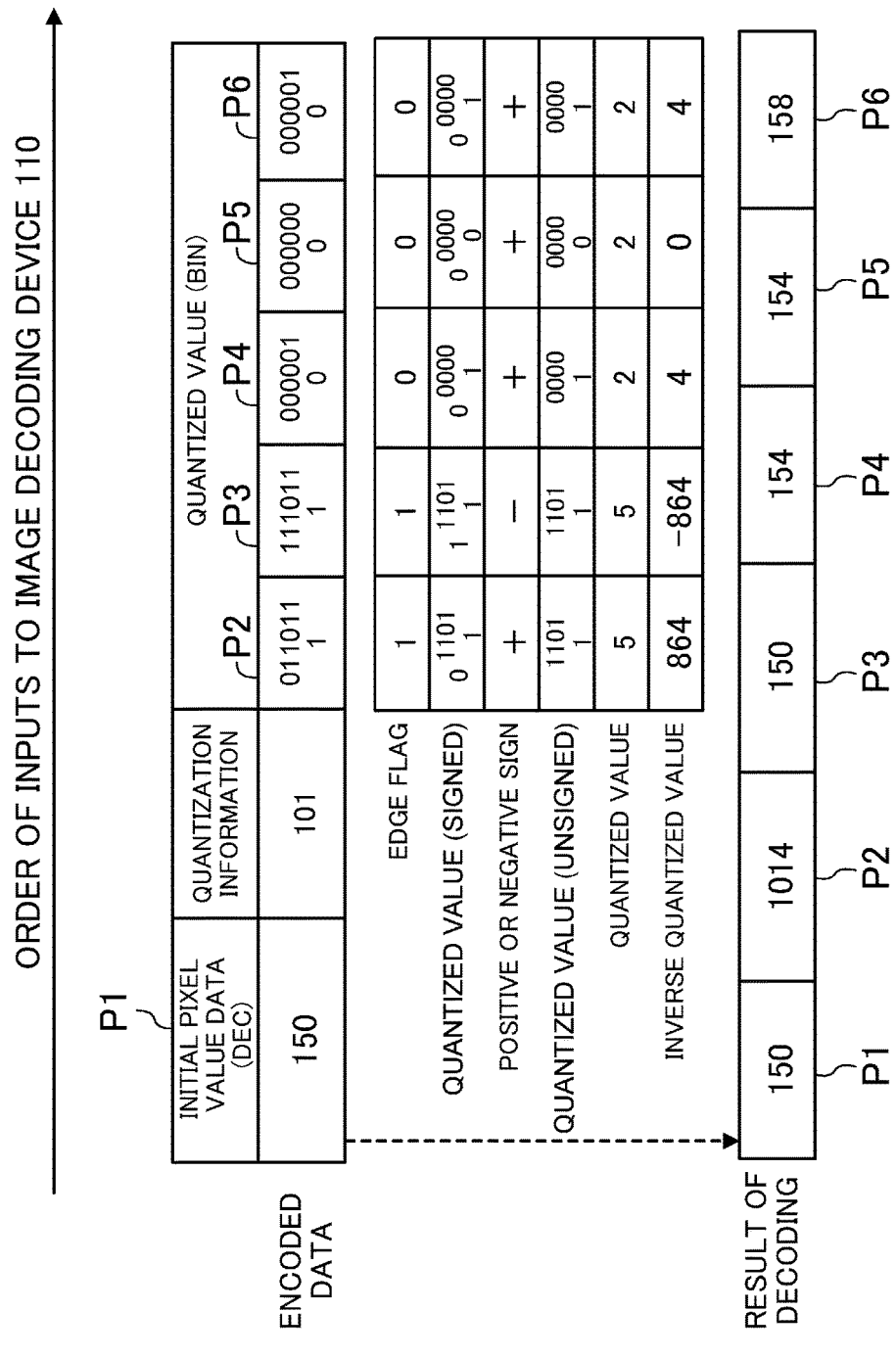
FIG. 12 is a diagram showing an example image decoding process of the first embodiment and the results of calculations.

FIG. 12 is a diagram for describing the image decoding process in this embodiment.

Here, the unpacking section 111 receives packed data in groups of 48 bits (S=48). It is assumed that the unpacking section 111 successively receives a 10-bit initial pixel value (N=10), or 3-bit quantization information (J=3), or a 7-bit quantized value corresponding to a pixel to be decoded (M=7). FIG. 12 is a diagram showing, as an example, the result of the image encoding process on six portions of pixel data (pixels P1-P6) of FIG. 6A, as data input to the image decoding device 110.

For example, it is assumed that, as shown in FIG. 9B, a plurality of portions of encoded data stored in an external memory are continuously input to the unpacking section 111. It is assumed that pixel data corresponding to the pixel P1 is an initial pixel value and therefore is represented by 10 bits. For example, data corresponding to each of the pixels P2-P6 is encoded data containing a quantized value and an edge flag shown in FIG. 7B or 7C, and therefore, is represented by a 7-bit binary code.

In the image decoding process, initially, step S301 is performed. In step S301, as shown in FIG. 9B, the unpacking section 111 separates encoded data into parts each having a predetermined number of bits, and thereafter, control proceeds to step S302.

In step S302, the unpacking section 111 determines whether or not the separated encoded data is an initial pixel value. If the determination result in step S302 is positive (YES), the unpacking section 111 transmits the received pixel data to the output section 116. Thereafter, control proceeds to step S307 described below. On the other hand, if the determination result in step S302 is negative (NO), control proceeds to step S303.

Here, it is assumed that the unpacking section 111 receives pixel data corresponding to the pixel P1 as an initial pixel value. It is assumed that the initial pixel value is "150." In this case, the unpacking section 111 transmits the input pixel value of "150" to the output section 116. The output section 116 transmits the received initial pixel value to the predicted pixel generator 114.

In the quantization width determination step of step S303, the quantization width determiner 112 determines a quantization width used in the inverse quantization process corresponding to each pixel to be decoded. Initially, the quantization width determiner 112 determines whether or not the encoded data received from the unpacking section 111 is quantization information (step S401 of FIG. 20). If the determination result of step S401 is negative (NO), control proceeds to step S403 described below. If the determination result is positive (YES), control proceeds to step S402.

Here, it is assumed that the encoded data received from the unpacking section 111 by the quantization width determiner 112 is J-bit quantization information. It is also assumed that the bit length J of the quantization information is 3 bits, and a value indicated by the quantization information is "101." In this case, control proceeds to step S402, in which the quantization information analyzer 117 analyzes the quantization information received by the quantization width determiner 112 to obtain the determination result of the edge determiner 309 and a quantization width used in the inverse quantization process. The quantization width needs to be equal to the quantization width which has been used in the image encoding process by the quantization processor 304, and therefore, is calculated based on the correspondence in the table of FIG. 8. Here, it is assumed that the quantization information received by the quantization width determiner 112 is "101." By analysis based on FIG. 8, it is determined that, in the image encoding process, the edge determiner 309 has determined that there are both a flat portion and an edge portion, and therefore, the quantization information analyzer 117 transmits information indicating "the presence of an edge" to the edge flag extractor 118. The quantization width used in the inverse quantization process is a flat portion quantization width of "2" or an edge portion quantization width of "5," and the quantization information analyzer 117 transmits information about the quantization width to the quantization width selector 119.

Next, it is assumed that the encoded data received from the unpacking section 111 by the quantization width determiner 112 is an M-bit quantized value corresponding to the pixel P2 to be decoded. In this case, the received encoded data is not quantization information (NO in step S401), and therefore, control proceeds to step S403. Here, it is assumed that the encoded data received from the unpacking section 111 by the quantization width determiner 112 is a quantized value for the pixel P2 to be decoded, and the value of a 7-bit (M=7) binary code indicated by the quantized value is "0110111."

In step S403, for example, based on the result of analysis in step S402 by the quantization information analyzer 117, it is determined whether or not a picture in a group to which a pixel of interest to be decoded belongs has both a flat portion and an edge portion. If the determination result is positive (YES in step S403), control proceeds to step S405.

Here, it is assumed that, based on the analysis result output by the quantization information analyzer 117 in step S402, it is determined that the picture in the group has both a flat portion and an edge portion (YES in step S403). It is also assumed that, as shown in FIGS. 7B and 7C, an edge flag is stored at the least significant bit of the quantized value received by the quantization width determiner 112.

Control proceeds to step S405. In step S405, the edge flag extractor 118 extracts the edge flag contained in the quantized value corresponding to the pixel of interest to be decoded. Thereafter, the edge flag extractor 118 transmits information about the extracted edge flag to the quantization width selector 119, and information about the quantized value to the inverse quantization processor 113. The least significant bit of the quantized value ("0110111") of the pixel P2 to be decoded is "1," and therefore, the edge flag extractor 118 determines that the pixel P2 is an edge pixel. Thereafter, the edge flag extractor 118 extracts, from the quantized value, the edge flag (the least significant bit "1" of the quantized value) contained in the quantized value ("0110111"). Therefore, the edge flag extractor 118 separates the quantized value for the pixel P2 to be decoded received from the quantization width determiner 112 into the edge flag ("1") indicating whether or not the pixel to be decoded is an edge pixel and the quantized value ("011011"). After the end of the extraction, the edge flag extractor 118 transmits information ("1") about the extracted edge flag to the quantization width selector 119, and information ("011011") about the quantized value to the inverse quantization processor 113. Thereafter, control proceeds to step S406.

Here, it is assumed that the information about an edge flag received from the edge flag extractor 118 by the quantization width selector 119 is "1." In this case, the pixel P2 can be identified as an edge pixel (YES in step S406). Therefore, control proceeds to step S407.

Here, it is assumed that, in step S402, the quantization information analyzer 117 determines that a quantization width for a group to which a pixel to be decoded belongs is a flat portion quantization width of "2" or an edge portion quantization width of "5." In this case, in step S407, it is determined that a quantization width for the pixel P2 is an edge portion quantization width of "5," and the quantization width determination process is ended. When the quantization width determination process in the inverse quantization process is ended, the quantization width selector 119 transmits the determined quantization width to the inverse quantization processor 113, and control proceeds to step S304.

In step S304, the inverse quantization processor 113 performs the inverse quantization process. In the inverse quantization process, the inverse quantization processor 113 performs inverse quantization by shifting the quantized value for each pixel to be decoded received from the quantization width determiner 112 upward (toward the most significant bit) by the number of bits corresponding to the quantization width used in inverse quantization received from the quantization width determiner 112. It is assumed that data calculated by the inverse quantization is a difference value D' represented by (N+1) ("11") bits.

Here, it is assumed that the quantization width received from the quantization width determiner 112 by the inverse quantization processor 113 is "5," and the binary code of the received quantized value is "011011." In this case, the inverse quantization processor 113 performs inverse quantization by shifting "011011" upward (toward the most significant bit) by 5 bits. As a result, a signed integer binary representation ("01101100000") of the (N+1) ("11")-bit difference value D' is calculated. As shown in FIGS. 7A-7C, the most significant bit of the quantized value indicates a positive or negative sign, and therefore, the difference value D' is a positive number "1101100000," i.e., "864." The inverse quantization processor 113 transmits the calculation result to the decoded value generator 115.

Note that when the quantization width received from the quantization width determiner 112 is "0," the inverse quantization processor 113 transmits the quantized value to the decoded value generator 115 directly without inverse quantization.

In step S305, the predicted pixel generator 114 calculates a predicted value for a pixel to be decoded. Specifically, the predicted pixel generator 114 calculates the predicted value using the prediction expression (1), because the same prediction scheme as that of the predicted value generation step S102 in the image encoding process of the image encoding device 300 is employed. Here, it is assumed that the predicted pixel generator 114 calculates a predicted value for the pixel P2 to be decoded. Based on the prediction expression (1), the pixel data of the pixel P1 which is the immediately previously received pixel to be decoded is the predicted value, and therefore, the pixel value "150" of the pixel P1 is received from the output section 116 and is calculated as the predicted value.

In step S306, the decoded value generator 115 calculates a decoded value based on a predicted value received from the predicted pixel generator 114 and a difference value D' received from the inverse quantization processor 113. Specifically, as shown in FIG. 12, the decoded value generator 115 adds the predicted value received from the predicted pixel generator 114 and the difference value D' received from the inverse quantization processor 113 together to generate the decoded value. Here, it is assumed that the predicted value received from the predicted pixel generator 114 is "150." It is also assumed that the difference value D' received from the inverse quantization processor 113 is "864." In this case, by adding "150" and "864" together, an N ("10")-bit decoded value of "1014" is calculated. The resulting decoded value is transmitted to the output section 116.

Note that, in this embodiment, the image encoding process is performed by predictive encoding using the prediction expression (1). Therefore, in the image decoding process, a decoded value is calculated by adding an inverse quantized value and a predicted value together. However, the method for calculating a difference value in the difference value calculator 303 of this embodiment is not limited only to the subtraction process of a predicted value and a pixel to be encoded. For example, any process that can extract change information from a predicted value, such as an exclusive OR operation of a predicted value and a pixel to be encoded etc., is, of course, applicable to the present disclosure.

The output section 116 stores the decoded pixel data to, for example, an external memory and the predicted pixel generator 114. As described above, in the image encoding device 300, when a predicted value for an h-th pixel to be encoded is calculated, an (h−1)th decoded pixel data which is obtained by the image decoding device 110 after being temporarily encoded may be employed. In this case, decoded pixel data transmitted by the output section 116 may be stored in the predicted pixel generator 302 of the image encoding device 300. Note that the output section 116 may output decoded pixel data to, for example, an external circuit which process an image instead of storing the decoded pixel data to an external memory.

In step S307, it is determined whether or not the image decoding process has been completed for Pix pixels packed in the fixed bit length of S bits by the packing section 305 of the image encoding device 300. Here, it is assumed that Pix is previously calculated as in the image encoding process.

If the determination result for the Pix pixels in step S307 is negative (NO), control proceeds to step S302, in which the image decoding device 110 executes at least one of steps S302-S306 on the next encoded data received by the unpacking section 111. Thereafter, the image decoding device 110 repeatedly performs steps S302-S306 on the pixels P3-P6, and successively outputs the resulting decoded pixel data.

On the other hand, if the determination result for the Pix pixels in step S307 is positive (YES), control proceeds to step S308.

In step S308, it is determined whether or not the decoding process has been completed for one image when the output section 116 outputs the decoded pixel data, using, for example, the unpacking section 111 etc. Thereafter, if the determination result is positive (YES), the decoding process is ended, and otherwise, control proceeds to step S301, in which at least one of steps S301-S307 is executed.

The results of the above processes and calculations, the calculation results of the pixels P2-P6 to be decoded, and the 10-bit decoded pixel data of each pixel output from the output section 116, are shown in FIG. 12.

Here, there is not the calculation result of the pixel P1 which is an initial pixel value. This is because when a pixel to be encoded is input as an initial pixel value in the image encoding process (YES in step S101 of FIG. 2), the quantization process is not performed, and the pixel to be encoded is directly input to the packing section 305 (step S109 of FIG. 2), and therefore, also in the image decoding process, when the unpacking section 111 receives pixel data as an initial pixel value, the input pixel data is directly transmitted to the output section 116.

Second Embodiment

In a second embodiment, another example of the image encoding device 300 described in the first embodiment will be described.

Figure 14A:
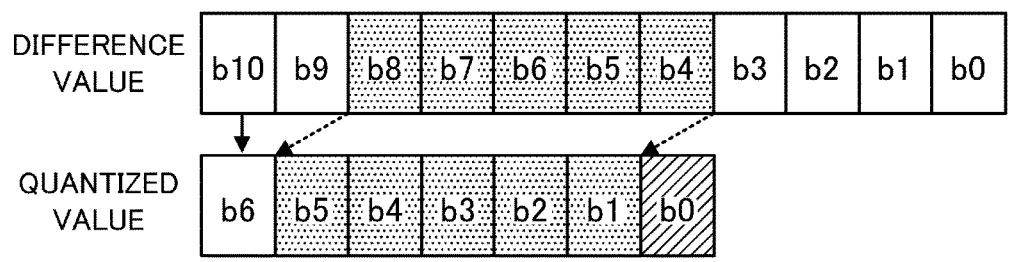
FIG. 14A is a diagram showing a schematic bit arrangement of a difference value and a quantized value in the second embodiment.
Figure 14B:
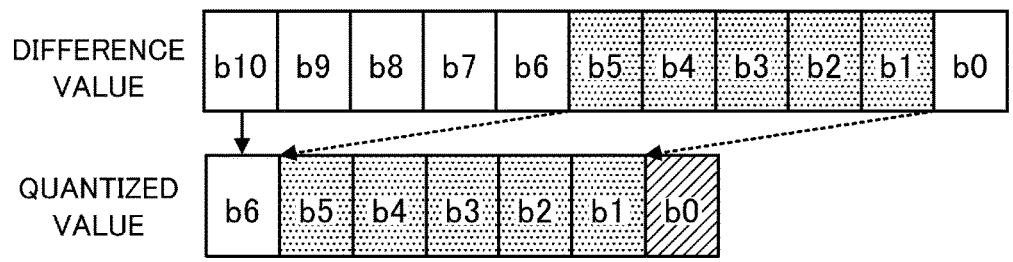
FIG. 14B is a diagram showing a schematic bit arrangement for a pixel other than edge pixels.

The second embodiment is different from the first embodiment in which the method for calculating an edge portion quantization width and a flat portion quantization width in the edge portion quantization width calculator 308 and the method for determining an edge pixel in the edge pixel determiner 310. Firstly, FIG. 13 shows a selection pattern of an edge portion quantization width and a flat portion quantization width of the edge portion quantization width calculator 308 in the second embodiment. FIGS. 14A and 14B show example schematic bit arrangements of a difference value D and a quantized value which are obtained when the second embodiment is applied. FIG. 15 is a diagram showing example quantization information which is generated by the packing section 305 in the second embodiment.

In a quantization width determination method employed in this embodiment, if it is determined that a picture in a group to which a pixel to be encoded belongs has both a flat portion and an edge portion, the edge portion quantization width calculator 308 selects an appropriate quantization width from a plurality of combinations of an edge portion quantization width and a flat portion quantization width. Specifically, the edge portion quantization width calculator 308 changes calculated values of an edge portion quantization width and a flat portion quantization width based on the largest quantization width Q_MAX and the smallest quantization width Q_MIN in the group. As a result, the value of a quantization width is determined, depending on the level of a difference value D between the pixel value of a pixel to be encoded and a predicted value, whereby a more appropriate quantization width can be selected on a pixel-by-pixel basis.

In this embodiment, as an example, patterns shown in FIG. 13 are previously prepared. The upper row of FIG. 13 is a combination (pattern) of an edge portion quantization width and a flat portion quantization width described in the first embodiment, and the lower row is an additional combination in this embodiment.

The edge portion quantization width calculator 308 calculates the largest quantization width Q_MAX and the smallest quantization width Q_MIN of Pix_G unit quantization widths Q corresponding to Pix_G pixels in a group. Thereafter, it is determined which of relationships shown in the upper and lower rows of FIG. 13 is established between the largest quantization width Q_MAX and the smallest quantization width Q_MIN.

Here, it is assumed that the largest quantization width Q_MAX and the smallest quantization width Q_MIN are "3" and "0," respectively. When the largest quantization width Q_MAX is "3," the number of bits of the maximum value of the absolute difference value is 9 bits. Specifically, as shown in FIG. 14A, effective bit data is stored in only 9 bits (b0-b8) of the bit data of the difference value D, excluding the most significant bit indicating a positive or negative sign. As can also be clearly seen from comparison to FIG. 7 of the first embodiment, this shows a case where although a picture in a group has both a flat portion and an edge portion, the difference value D of the edge portion is relatively small, i.e., although an edge is close to the flat region, the steepness of the edge portion is mild compared to the first embodiment.

In such a case, as in the lower row of FIG. 13, the threshold TH2 for discriminating edge pixels from pixels other than edge pixels in the edge pixel determiner 310 is reset, whereby a quantization width for a flat portion can be reduced, and a degradation in image quality can be further reduced.

Here, the value of the threshold TH2 is set to "1," although it is "2" in the first embodiment. It is assumed that the bit length M of the quantized value is "7." Based on the expression (8), TH2+(M−1)=7. When the bit length of the difference value D is smaller than 7 bits, the quantization process is performed using a flat portion quantization width. Therefore, for quantized values other than edge pixels, the bit data (b0-b6) of the difference value D needs to be stored as a quantized value. As shown in FIG. 14B, the bit data b1-b5 of the difference value D is stored in the bits b1-b5 of the quantized value. In this case, the flat portion quantization width has the same value ("1") as that of the threshold TH2.

Note that, as indicated by the expression (8), the value of the bit length L of the difference value D which is used to determine an edge pixel is derived from the threshold TH2. Therefore, also in the second embodiment, if the threshold TH2 is set so that the bit length L is extremely small, then when it is determined that a pixel to be encoded is an edge pixel, most of the information of the pixel data to be encoded is lost. Therefore, in the second embodiment, when a plurality of combinations of an edge portion quantization width and a flat portion quantization width are prepared, the threshold TH2 may be set so that the difference between the bit length L and the edge portion quantization width which is calculated based on the expression (8) is always constant.

In the second embodiment, the packing section 305 generates quantization information shown in FIG. 15. Compared to FIG. 8, quantization information "110" is added. As a result, also in the image decoding device 110, even when there are a plurality of combinations of an edge portion quantization width and a flat portion quantization width, the combinations can be changed by analyzing the quantization information using the quantization information analyzer 117.

Thus, compared to the first embodiment (the upper row of FIG. 13), the value of the flat portion quantization width is reduced from "2" to "1." Therefore, when an edge having a relatively mild change is close to a flat region, a degradation in image quality of the flat portion can be further reduced.

Note that a plurality of combinations of an edge portion quantization width and a flat portion quantization width may be previously prepared, depending on the bit data of possible difference values D. As a result, a plurality of edge occurrence patterns can be handled, whereby a degradation in image quality of a flat portion can be further reduced.

Third Embodiment

In a third embodiment, an example digital still camera including the image encoding device 300 and the image decoding device 110 of the first embodiment will be described.

Figure 16:
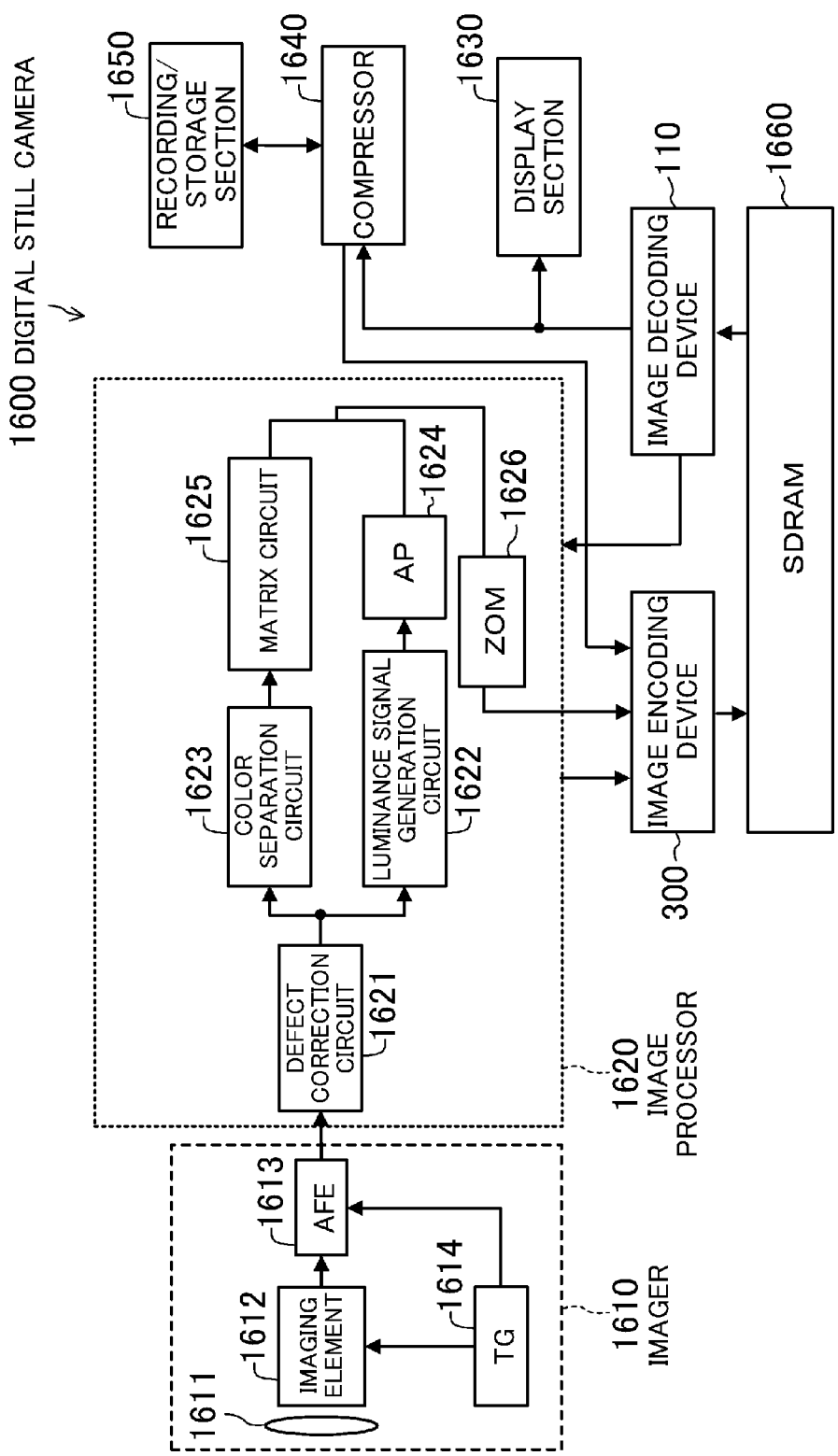
FIG. 16 is a block diagram showing a configuration of a digital still camera according to a third embodiment of the present disclosure.

FIG. 16 is a block diagram showing a configuration of a digital still camera 1600 according to the third embodiment. As shown in FIG. 16, the digital still camera 1600 includes the image encoding device 300 and the image decoding device 110. The configurations and functions of the image encoding device 300 and the image decoding device 110 have been described above in the first embodiment, and therefore, will not be described.

The digital still camera 1600 further includes an imager 1610, an image processor 1620, a display section 1630, a compressor 1640, a recording/storage section 1650, and an SDRAM 1660.

The imager 1610 captures an image of a subject, and outputs digital image data (RAW data) corresponding to the subject image. In this example, the imager 1610 includes an optical system 1611, an imaging element 1612, an analog front end (abbreviated as AFE in FIG. 16) 1613, and a timing generator (abbreviated as TG in FIG. 16) 1614. The optical system 1611, which includes a lens etc., images a subject onto the imaging element 1612. The imaging element 1612 converts light incident from the optical system 1611 into an electrical signal. As the imaging element 1612, various imaging elements may be employed, such as an imaging element including a charge coupled device (CCD), an imaging element including a CMOS, etc. The analog front end 1613 performs signal processing, such as noise removal, signal amplification, A/D conversion, etc., on an analog signal output by the imaging element 1612, and outputs the resulting data as image data. The timing generator 1614 supplies, to the imaging element 1612 and the analog front end 1613, a clock signal indicating reference operation timings for the imaging element 1612 and the analog front end 1613.

The image processor 1620 performs predetermined image processing on pixel data (RAW data) received from the imager 1610, and outputs the resulting data to the image encoding device 300. As shown in FIG. 16, the image processor 1620 typically includes a defect correction circuit 1621, a luminance signal generation circuit 1622, a color separation circuit 1623, an aperture correction circuit (abbreviated as AP in FIG. 16) 1624, a matrix process circuit 1625, a zoom circuit (abbreviated as ZOM in FIG. 16) 1626 which enlarges and reduces an image, etc.

When the digital still camera 1600 is turned on, the defect correction circuit 1621 detects a defective pixel, if any, by obtaining light blocking data of the imaging element 1612, and stores location information of the detected defective pixel to storage means, such as a register, a memory etc. When an image is captured, the defect correction circuit 1621 calculates an interpolated value using a plurality of portions of pixel data adjacent to the defective pixel in the imaging element 1612, based on the stored location information, and replaces the value of the defective pixel with the interpolated value. The luminance signal generation circuit 1622 generates a luminance signal (Y signal) based on the RAW data. The color separation circuit 1623 generates a color difference signal (Cr/Cb signal) from the RAW data. The aperture correction circuit 1624 adds a high frequency component to the luminance signal generated by the luminance signal generation circuit 1622 to enhance an apparent resolution. The matrix process circuit 1625 adjusts the hue balance of the output of the color separation circuit 1623 which has been impaired due to the spectroscopic characteristics of the imaging element or image processing.

Typically, in most cases, the image processor 1620 temporarily stores pixel data to be processed to a memory, such as an SDRAM etc., and performs predetermined image processing, YC signal generation, zooming, etc. on the temporarily stored data, and temporarily stores the processed data back to the SDRAM. Therefore, the image processor 1620 may not only output data to the image encoding device 300 but also receive data from the image decoding device 110.

The display section 1630 displays an output (decoded image data) of the image decoding device 110.

The compressor 1640 compresses an output of the image decoding device 110 based on a predetermined standard, such as JPEG etc., and outputs the resulting image data to the recording/storage section 1650. The compressor 1640 also decompresses image data read from the recording/storage section 1650, and outputs the resulting image data to the image encoding device 300. In other words, the compressor 1640 can process data based on the JPEG standard. The compressor 1640 having such functions is typically included in a digital still camera.

The recording/storage section 1650 receives and records the compressed image data to a recording medium (e.g., a non-volatile memory etc.). The recording/storage section 1650 also reads out compressed image data recorded in the recording medium, and outputs the compressed image data to the compressor 1640.

Signals input to the image encoding device 300 and the image decoding device 110 of the third embodiment are, for example, the RAW data input from the imager 1610. Note that signals input to the image encoding device 300 are not limited to the RAW data. For example, pixel data to be processed by the image encoding device 300 and the image decoding device 110 may be, for example, data of a YC signal (a luminance signal or a color difference signal) generated from the RAW data by the image processor 1620, or data (data of a luminance signal or a color difference signal) obtained by decompressing JPEG image data which has been temporarily compressed based on JPEG etc.

As described above, the digital still camera 1600 of the third embodiment includes the image encoding device 300 and the image decoding device 110 which process RAW data or a YC signal, in addition to the compressor 1640 which is typically included in a digital still camera. As a result, the digital still camera 1300 of the third embodiment can perform high-speed image capturing operation with an increased number of images having the same resolution which can be shot in a single burst, using the same memory (e.g., an SDRAM etc.) capacity. The digital still camera 1600 can also enhance the resolution of a moving image which is stored into a memory (e.g., an SDRAM etc.) having the same capacity.

The configuration of the digital still camera 1600 of the third embodiment is also applicable to the configuration of a digital camcorder which includes an imager, an image processor, a display section, a compressor, a recording/storage section, and an SDRAM as in the digital still camera 1600.

Fourth Embodiment

In a fourth embodiment, an example configuration of a digital still camera whose imaging element includes the image encoding device 300 will be described.

Figure 17:
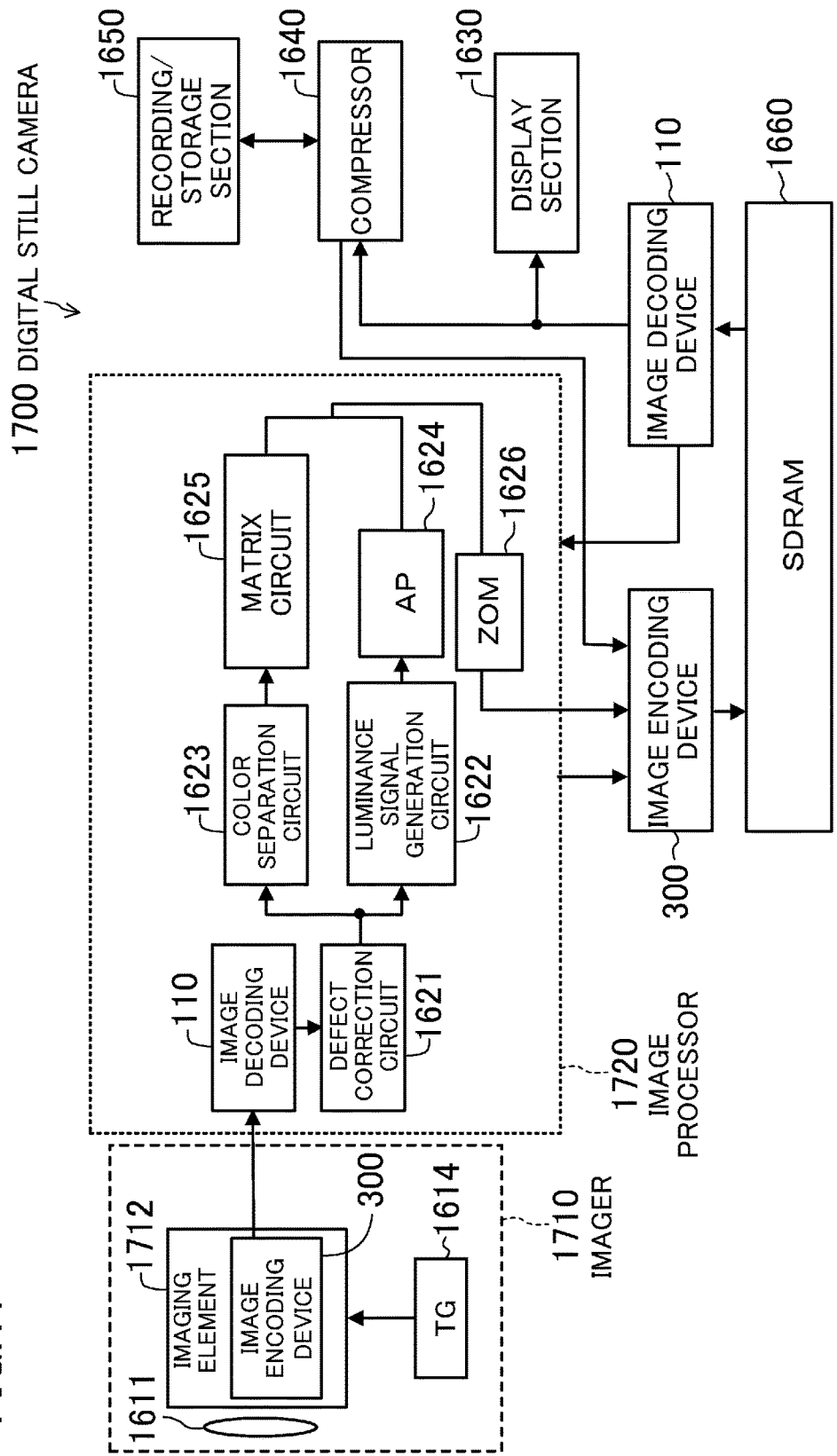
FIG. 17 is a block diagram showing a configuration of a digital still camera according to a fourth embodiment of the present disclosure.

FIG. 17 is a block diagram showing a configuration of the digital still camera 1700 of the fourth embodiment. As shown in FIG. 17, the digital still camera 1700 is similar to the digital still camera 1600 of FIG. 16, except that an imager 1710 is provided instead of the imager 1610, and an image processor 1720 is provided instead of the image processor 1620, and therefore, will not be described in detail.

The imager 1710 is similar to the imager 1610 of FIG. 16, except that an imaging element 1712 is provided instead of the imaging element 1612, and the analog front end 1613 is removed, and therefore, will not be described. For example, the imaging element 1712 is a CMOS sensor. In each pixel, an amplifier and an A/D conversion circuit are provided to output a digital signal. Therefore, the imager 1710 may include the image encoding device 300 of FIG. 3.

Figure 11:
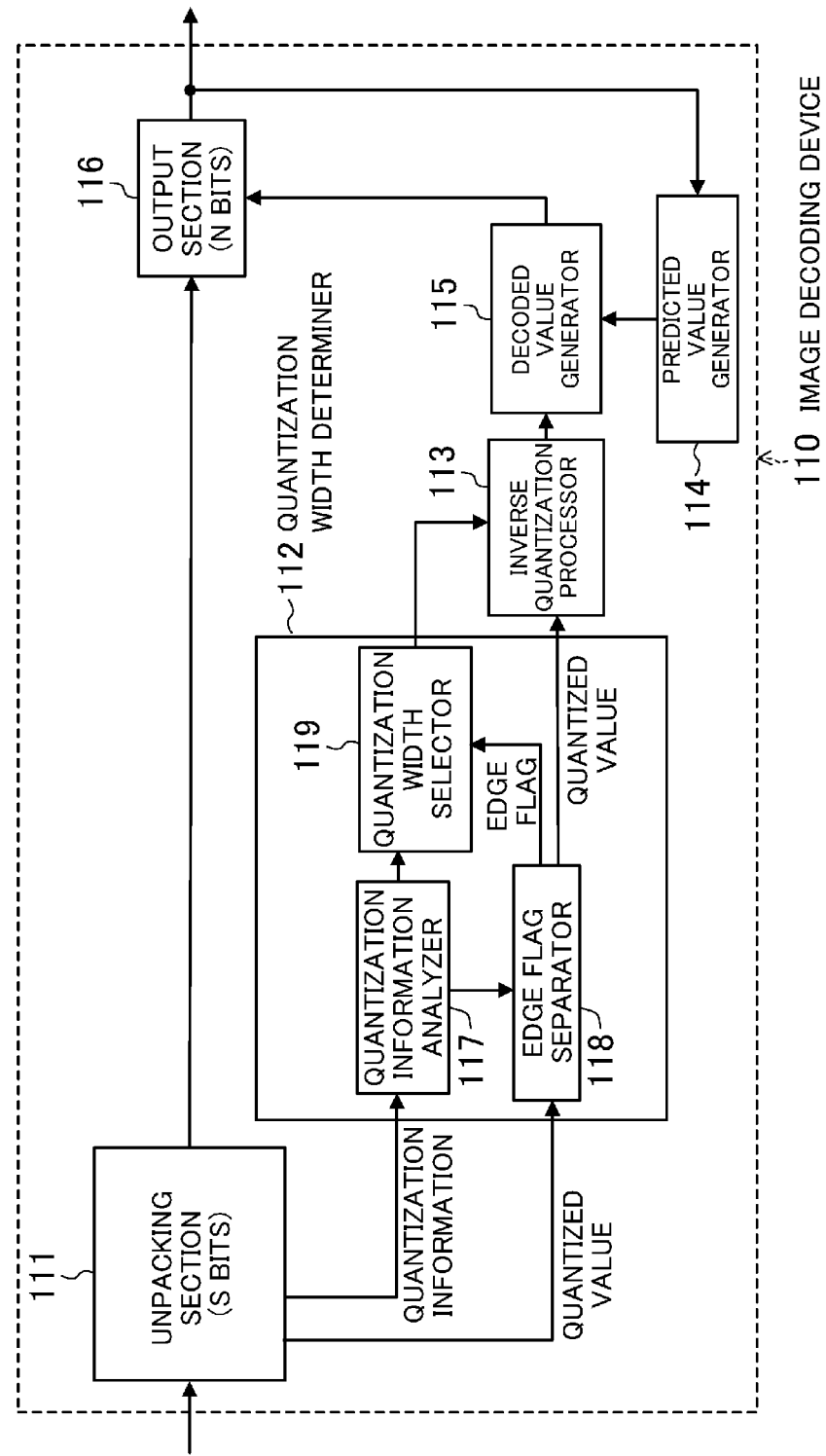
FIG. 11 is a block diagram showing a configuration of the image decoding device of the first embodiment.

The image processor 1720 is similar to the image processor 1620 of FIG. 16, except that the image decoding device 110 of FIG. 11 is further provided, and therefore, will not be described.

The image encoding device 300 included in the imaging element 1712 encodes a pixel signal (RAW data) generated by the imaging element 1712, and outputs the encoded data to the image decoding device 110 included in the image processor 1720.

The image decoding device 110 included in the image processor 1720 decodes data received from the image encoding device 300. By this process, the efficiency of data transfer between the imaging element 1712, and the image processor 1720 included in the integrated circuit, can be improved.

Therefore, in the digital still camera 1700 of the fourth embodiment, the number of images having the same resolution which can be shot in a single burst, and the resolution of a moving image, can be increased using the same memory capacity compared to the digital still camera 1600 of the third embodiment.

On the other hand, in recent years, there has been a demand for an image output of 30 images/sec using the imaging element 1712 having a large number of pixels. Specifically, there has been a demand for an image output of 30 images/sec using an imaging element having a large number of pixels, or high-speed image capturing with an image output of 100 or more images/sec having a lower resolution (e.g., high-speed image capturing of the moment when a baseball hits a bat, etc.). To achieve this, the speed of reading pixel data may be increased. However, if the read speed is simply increased, an increase in power consumption, noise, and spurious emission may disadvantageously occur. Therefore, the output signal of the imager 1710 may be converted into serial data using high-speed clock before being output to external circuitry. In the fourth embodiment, the image encoding device 300 is further provided in the imaging element 1712. Therefore, the efficiency of data transfer between the imager 1710 and the image processor 1720 can be improved, whereby high-speed image capturing is effectively achieved.

Unlike the third embodiment, when the image encoding device 300 is included in the imager 1710 as in the fourth embodiment, the image encoding process is executed at a stage preceding the defect correction circuit 1621 provided in the image processor 1720. Thus, when a defective pixel occurs in the imaging element 1712, the pixel value (signal level) of the defective pixel is input to the image encoding device 300 directly without being corrected.

Typical examples of a defective pixel include a black spot which outputs only a low pixel value without reacting to the sensitivity, and a white spot which outputs only a pixel value(s) close to the saturated level. Therefore, when the pixel value of a defective pixel is input to the image encoding device 300 directly without being corrected, a steep edge is likely to occur in a flat region irrespective of the picture of the subject. Therefore, a region containing a defective pixel is quantized using a large quantization width, and therefore, is likely to be visually perceived as a large degradation.

However, in the fourth embodiment, for pixel data input to the image encoding device 300, even when a steep edge occurs due to a defective pixel, an influence of the quantization process on adjacent flat pixels is reduced or eliminated. Therefore, even if the image encoding device 300 is provided at a stage preceding the defect correction circuit 1621, the image encoding process can be performed without any problem. Therefore, the image encoding device 300 can be provided in the imager 1710, and therefore, the efficiency of data transfer between the imager 1710 and the image processor 1720 can be effectively improved.

Fifth Embodiment

In a fifth embodiment, an example configuration of a surveillance camera which receives image data output from the image encoding device 300 will be described.

Figure 18:
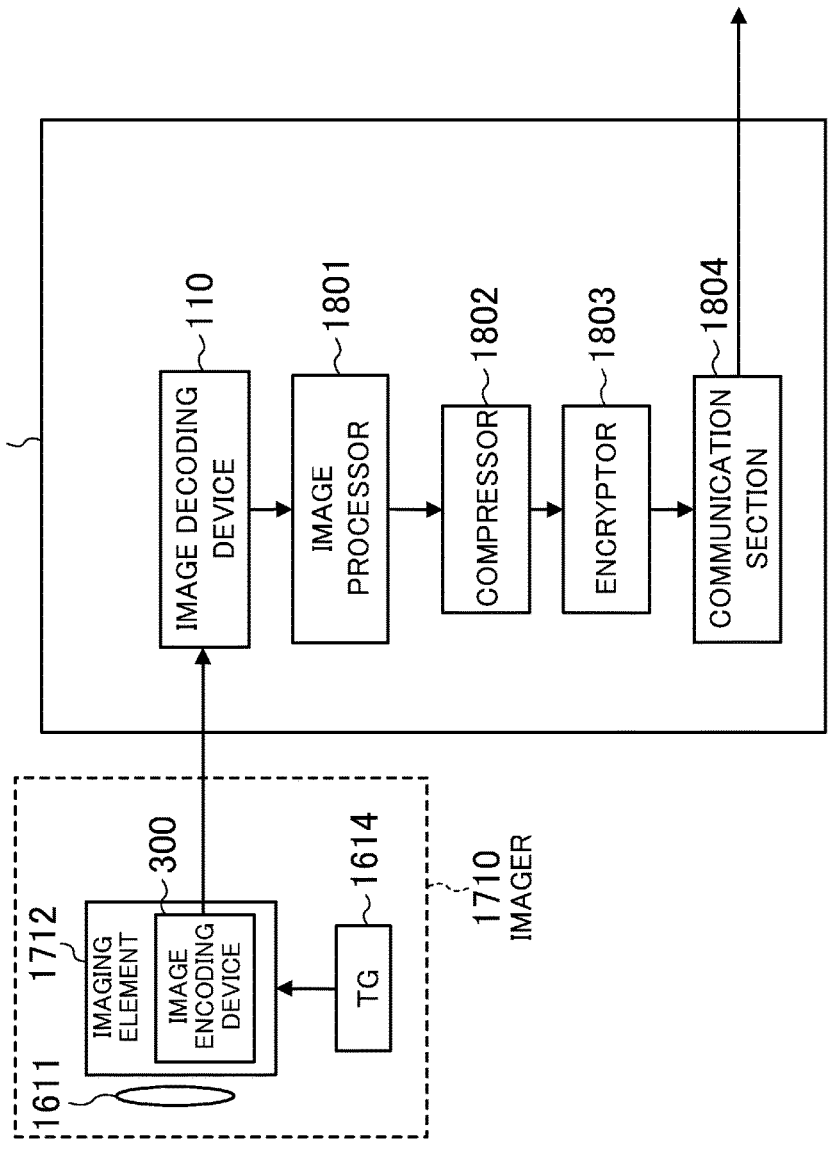
FIG. 18 is a block diagram showing a configuration of a surveillance camera according to a fifth embodiment of the present disclosure.

FIG. 18 is a diagram showing the configuration of the surveillance camera 1800.

In the surveillance camera 1800, image data is typically encrypted in order to ensure the security of the image data transmitted on a transmission path from the surveillance camera 1800 so that the image data is protected from the third party. Typically, image data which has been subjected to predetermined image processing by an image processor 1801 in a surveillance camera signal processor 1810 is compressed by a compressor 1802 based on a predetermined standard, such as JPEG, MPEG4, H.264, etc., and moreover, the resulting data is encrypted by an encryptor 1803 before being transmitted from a communication section 1804 onto the Internet, whereby the privacy of individuals is protected.

Therefore, as shown in FIG. 18, an output (encoded data) of the imager 1710 including the image encoding device 300 is input to the surveillance camera signal processor 1810, and then decoded by the image decoding device 110 included in the surveillance camera signal processor 1810. As a result, image data captured by the imager 1710 can be pseudo-encrypted. Therefore, the efficiency of data transfer between the imager 1710 and the surveillance camera signal processor 1810, and security on a transmission path, can be ensured, and therefore, the level of security can be improved compared to the conventional art.

Therefore, by providing the image encoding device 300 and the image decoding device 110 in a surveillance camera, high-speed image capturing operation can be achieved. For example, the efficiency of data transfer of the surveillance camera can be improved, the resolution of a moving image can be enhanced, etc. Moreover, by pseudo-encrypting image data, security can be enhanced. For example, the leakage of image data can be reduced or prevented, privacy can be protected, etc.

Sixth Embodiment

Figure 19:
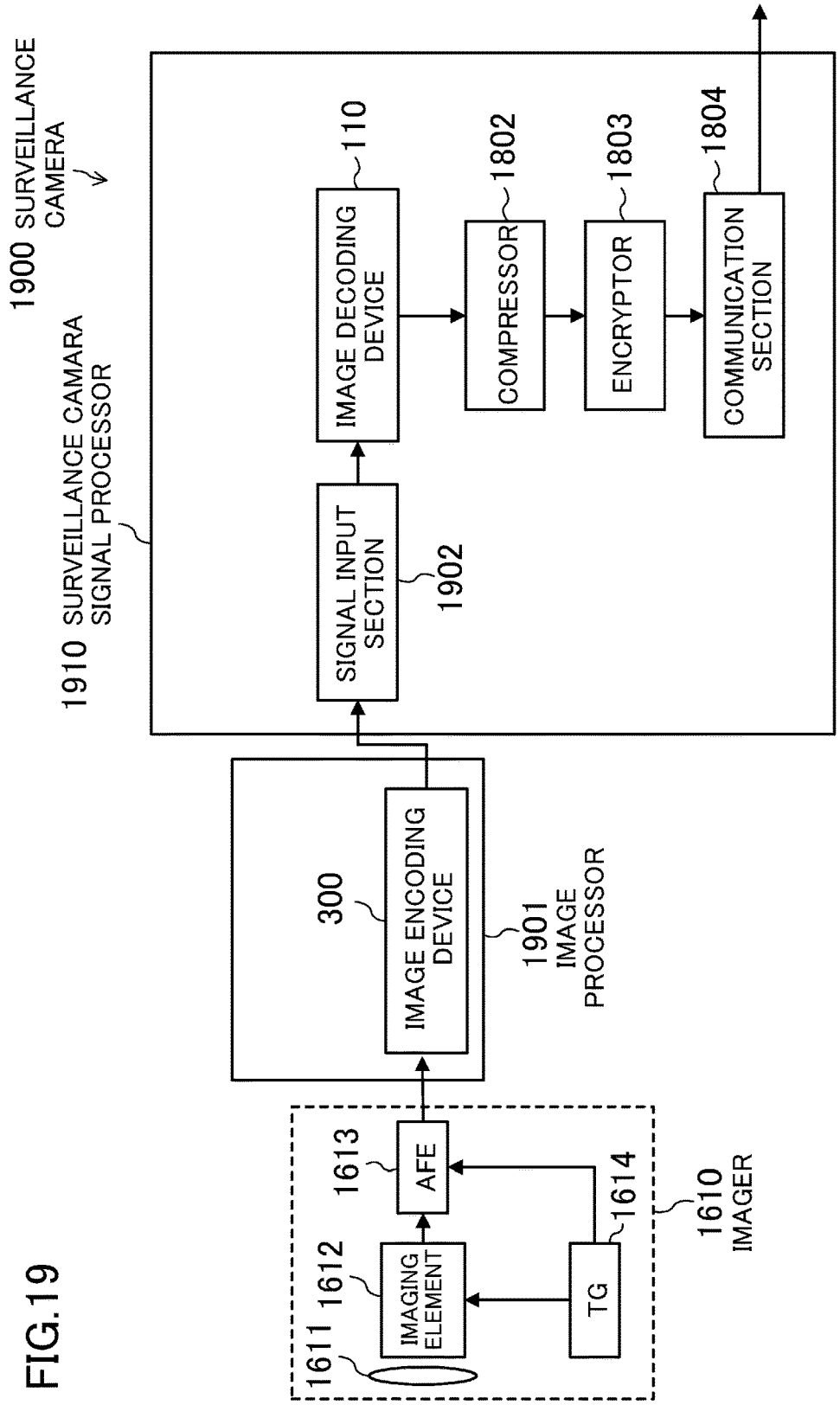
FIG. 19 is a block diagram showing a configuration of a surveillance camera according to a sixth embodiment of the present disclosure.

FIG. 19 is a diagram showing a configuration of a surveillance camera 1900 according to a sixth embodiment.

As shown in FIG. 19, the surveillance camera device is implemented as follows. An image processor 1901 which performs predetermined camera image processing on an image input from an imager 1610, and a signal input section 1902, are provided in the surveillance camera device. A surveillance camera signal processor 1910 which receives and compresses image data transmitted by the image processor 1901, encrypts the resulting image data, and outputs the encrypted image data via a communication section 1804 onto the Internet, may be implemented as a separate LSI.

In the sixth embodiment, the image encoding device 300 is included in the image processor 1901, and the image decoding device 110 is included in the surveillance camera signal processor 1910. As a result, image data transmitted by the image processor 1901 can be pseudo-encrypted. Therefore, the efficiency of data transfer between the image processor 1901 and the surveillance camera signal processor 1910, and security on a transmission path, can be ensured, and therefore, the level of security can be improved compared to the conventional art.

Thus, in each embodiment, by performing fixed-length encoding, quantization widths can be adaptively changed on a pixel-by-pixel basis while random accessibility is maintained, whereby an influence of occurrence of a defective pixel or a steep edge on a flat region can be reduced or eliminated.

Note that the above embodiments are, of course, for illustrative purposes only. In other words, the claimed subject matter has a more general concept (i.e., an abstraction) of the above embodiments. The more general concept may, of course, be carried out (implemented or realized) in the above embodiments (examples), or in other embodiments which are partially or totally different from the above embodiments.

As described above, in the image encoding method and device and the image decoding method and device of the present disclosure, image data can be compressed while the fixed length is ensured for the bus width of data transfer of an integrated circuit etc.

It is determined whether or not there are both a flat portion and an edge portion, and based on the determination result, quantization widths in a quantization process are adaptively changed on a pixel-by-pixel basis. Therefore, even in a region in which a defective pixel or a steep edge occurs, an influence of a quantization error on a flat region can be reduced or eliminated. Therefore, in devices which handle images, such as digital still cameras, network cameras, etc., image data can be encoded and decoded while random accessibility is maintained and a degradation in image quality due to image compression is reduced or prevented. Therefore, it is possible to catch up with a recent increase in the amount of image data to be processed.

What is claimed is:

1. An image encoding method for receiving pixel data of a pixel to be compressed, and compressing received pixel data, the image encoding method comprising:
    a predicted pixel generation step of generating a predicted value for the pixel data based on at least one of pixels adjacent to the pixel to be compressed;
    a quantization step of quantizing a difference value between the pixel data and the predicted value generated in the predicted pixel generation step to a quantized value having a smaller fixed number of bits than that of the pixel data, to compress the pixel data to the quantized value; and
    a quantization width determination step of determining a quantization width used in the quantization step,
    wherein, in the quantization width determination step, it is determined whether or not there are both a flat portion and an edge portion, in a group of a plurality of pixels, and based on a result of the determination, quantization widths for respective pixels used in the quantization step are adaptively changed on a pixel-by-pixel basis,
    when it is determined that there are both the flat portion and the edge portion in the group, the quantization widths are determined such that pixels belonging to the flat portion in the group have a quantization width set to be a first value, and pixels belonging to the edge portion in the group have a quantization width set to be a second value larger than the first value, and
    when it is determined that there are not both the flat portion and the edge portion in the group, the quantization widths are determined such that all of the pixels in the group have a quantization width set to be a third value larger than the first value and smaller than the second value.

2. The image encoding method of claim 1, wherein:
    the quantization width determination step includes:
        an edge determination step of determining whether or not there are both a flat portion and an edge portion, based on a characteristic of the difference value in the group, and
        an edge pixel determination step of determining whether each of pixels included in the group is a pixel in an edge portion or a pixel in a flat portion, based on the difference value, and
    based on a result of the determination of the edge determination step and a result of the determination of the edge pixel determination step, the quantization widths for the respective pixels used in the quantization step are adaptively changed on a pixel-by-pixel basis.

3. The image encoding method of claim 2, wherein in the edge determination step, if a difference between a largest difference value and a smallest difference value in the group is larger than or equal to a first threshold, it is determined that there are both a flat portion and an edge portion in the group.

4. The image encoding method of claim 3, wherein the first threshold is a power of two.

5. The image encoding method of claim 2, wherein in the edge determination step, if a largest difference value in the group is larger than or equal to a second threshold and a smallest difference value is smaller than or equal to a third threshold, it is determined that there are both a flat portion and an edge portion in the group.

6. The image encoding method of claim 5, wherein the second and third thresholds are each a power of two.

7. The image encoding method of claim 2, wherein in the edge pixel determination step, it is determined that a pixel in the group is a pixel in an edge portion if the difference value is larger than or equal to a fourth threshold, and a pixel in a flat portion otherwise.

8. The image encoding method of claim 7, wherein the fourth threshold is a power of two.

9. The image encoding method of claim 2, wherein in the quantization width determination step, it is determined whether to use a first quantization width, or a second and a third quantization width, as the quantization width used in the quantization step, on a group-by-group basis, based on a result of the determination of the edge determination step, and it is determined whether to use the second quantization width or the third quantization width as the quantization width used in the quantization step, on a pixel-by-pixel basis, based on a result of the determination of the edge pixel determination step.

10. The image encoding method of claim 2, wherein the quantization width determination step includes
    an initial quantization width calculation step of calculating a first quantization width corresponding to a largest difference value in the group, and
    an edge portion quantization width calculation step of calculating a second quantization width used in quantization of an edge portion and a third quantization width used in quantization of a flat portion.

11. The image encoding method of claim 10, wherein
the second quantization width has a value obtained by adding one to the first quantization width.

12. The image encoding method of claim 10, wherein
the third quantization width is smaller than the first quantization width.

13. The image encoding method of claim 10, wherein
in the edge portion quantization width calculation step, a quantized width is selected from a plurality of the third quantization widths corresponding to a difference between a largest difference value and a smallest difference value in the group.

14. The image encoding method of claim 1, further comprising:
a packing step of inserting, into the quantized value, a 1-bit flag indicating whether or not a pixel is located in an edge portion, and outputting the resulting quantized value.

15. The image encoding method of claim 1, further comprising:
a packing step of generating, for each of groups of a plurality of pixels, S-bit encoded data containing at least one of the quantized value for pixels in the group, information about the quantization width, and a result of the determination of whether or not there are both a flat portion and an edge portion, where S is a natural number.

16. The image encoding method of claim 1, wherein
a difference value between input N-bit pixel data, where N is a natural number, and the predicted value having the same bit length, is encoded to a fixed-length code having a predetermined bit length of M, where M is a natural number smaller than N.

17. An image decoding method, wherein
input encoded data contains a quantized value of fixed number of bits,
the quantized value is obtained by quantizing a difference value between pixel data and a predicted value for the pixel data, and the predicted value for the pixel data is generated based on at least one of pixels adjacent to a pixel of the pixel data, and
the quantized value is decoded to the pixel data,
the image decoding method comprising:
a predicted pixel generation step of generating the predicted value for the current pixel data based on past pixel data which has already been decoded;
an inverse quantization step of inverse quantizing the quantized value to generate the difference value having the quantized value which has been inverse quantized; and
a quantization width determination step of determining a quantization width used in the inverse quantization step, on a pixel-by-pixel basis, based on encoded quantization information and an encoded quantized value,
wherein, in the quantization width determination step, quantization widths for respective pixels used in the inverse quantization step are adaptively changed on a pixel-by-pixel basis,
in the quantization width determination step, it is determined whether or not there are both a flat portion and an edge portion, in a group of a plurality of pixels,
when there are both a flat portion and an edge portion in a group of a plurality of pixels, the quantization width is determined such that pixels belonging to the flat portion in the group have a quantization width set to be a first value, and pixels belonging to the edge portion in the group have a quantization width set to be a second value larger than the first value, and
when there are not both a flat portion and an edge portion in a group of a plurality of pixels, the quantization widths are determined such that all of the pixels in the group have a quantization width set to be a third value larger than the first value and smaller than the second value.

18. An image encoding device for receiving pixel data of a pixel to be compressed, and compressing received pixel data, the image encoding device comprising:
a predicted pixel generator configured to generate a predicted value for the pixel data based on at least one of pixels adjacent to the pixel to be compressed;
a quantizer configured to quantize a difference value between the pixel data and the predicted value generated by the predicted pixel generator to a quantized value having a smaller fixed number of bits than that of the pixel data to compress the pixel data to the quantized value; and
a quantization width determiner configured to determine a quantization width used in the quantizer,
wherein the quantization width determiner determines whether or not there are both a flat portion and an edge portion, in a group of a plurality of pixels, and based on a result of the determination, adaptively changes quantization widths for the respective pixels used in the quantizer on a pixel-by-pixel basis,
when it is determined that there are both the flat portion and the edge portion in the group, the quantization widths are determined such that pixels belonging to the flat portion in the group have a quantization width set to be a first value, and pixels belonging to the edge portion in the group have a quantization width set to be a second value larger than the first value, and
when it is determined that there are not both the flat portion and the edge portion in the group, the quantization widths are determined such that all of the pixels in the group have a quantization width set to be a third value larger than the first value and smaller than the second value.

19. An image decoding device, wherein
input encoded data contains a quantized value of fixed number of bits,
the quantized value is obtained by quantizing a difference value between pixel data and a predicted value for the pixel data, and the predicted value for the pixel data is generated based on at least one of pixels adjacent to a pixel of the pixel data, and
the quantized value is decoded to the pixel data,
the image decoding device comprising:
a predicted pixel generator configured to generate the predicted value for the current pixel data based on past pixel data which has already been decoded;
an inverse quantizer configured to inverse quantize the quantized value to generate the difference value having the quantized value which has been inverse quantized; and
a quantization width determiner configured to determine a quantization width used in the inverse quantizer, on a pixel-by-pixel basis, based on encoded quantization information and an encoded quantized value,
wherein the quantization width determiner adaptively changes quantization widths for respective pixels used in the inverse quantizer on a pixel-by-pixel basis, the quantization width determiner determines whether or not there are both a flat portion and an edge portion, in a group of a plurality of pixels, when there are both a flat portion and an edge portion in a group of a plurality of pixels, the quantization width determiner determines the quantization widths such that pixels belonging to the flat portion in the group have a quantization width set to be a first value, and pixels belonging to the edge portion in the group have a quantization width set to be a second value larger than the first value, and when there are not both a flat portion and an edge portion in a group of a plurality of pixels, the quantization widths are determined such that all of the pixels in the group have a quantization width set to be a third value larger than the first value and smaller than the second value.

20. The image encoding device of claim 18, wherein the pixel data is RAW data input from an imaging element.

21. The image encoding device of claim 18, wherein the pixel data is a luminance signal or a color difference signal which are generated by an image signal processing device based on RAW data which is input from an imaging element to the image signal processing device.

22. The image encoding device of claim 18, wherein the pixel data is a luminance signal or a color difference signal which are obtained by a decompressing device decompressing a joint photographic experts group (JPEG) image.

23. A digital still camera comprising:
the image encoding device of claim 18; and
an image decoding device, wherein:
input encoded data contains a quantized value,
the quantized value is obtained by quantizing a difference value between pixel data and a predicted value for the pixel data, and the predicted value for the pixel data is generated based on at least one of pixels adjacent to a pixel of the pixel data,
the quantized value is decoded to the pixel data,
the image decoding device comprises:
  a predicted pixel generator configured to generate the predicted value for the current pixel data based on past pixel data which has already been decoded;
  an inverse quantizer configured to inverse quantize the quantized value to generate the difference value having the quantized value which has been inverse quantized; and
  a quantization width determiner configured to determine a quantization width used in the inverse quantizer, on a pixel-by-pixel basis, based on encoded quantization information and an encoded quantized value, and
the quantization width determiner adaptively changes quantization widths for respective pixels used in the inverse quantizer on a pixel-by-pixel basis.

24. A digital camcorder comprising:
the image encoding device of claim 18; and
an image decoding device, wherein:
input encoded data contains a quantized value,
the quantized value is obtained by quantizing a difference value between pixel data and a predicted value for the pixel data, and the predicted value for the pixel data is generated based on at least one of pixels adjacent to a pixel of the pixel data,
the quantized value is decoded to the pixel data,
the image decoding device comprises:
  a predicted pixel generator configured to generate the predicted value for the current pixel data based on past pixel data which has already been decoded;
  an inverse quantizer configured to inverse quantize the quantized value to generate the difference value having the quantized value which has been inverse quantized; and
  a quantization width determiner configured to determine a quantization width used in the inverse quantizer, on a pixel-by-pixel basis, based on encoded quantization information and an encoded quantized value, and
the quantization width determiner adaptively changes quantization widths for respective pixels used in the inverse quantizer on a pixel-by-pixel basis.

25. A surveillance camera comprising:
the image encoding device of claim 18; and
an image decoding device, wherein:
input encoded data contains a quantized value,
the quantized value is obtained by quantizing a difference value between pixel data and a predicted value for the pixel data, and the predicted value for the pixel data is generated based on at least one of pixels adjacent to a pixel of the pixel data,
the quantized value is decoded to the pixel data,
the image decoding device comprises:
  a predicted pixel generator configured to generate the predicted value for the current pixel data based on past pixel data which has already been decoded;
  an inverse quantizer configured to inverse quantize the quantized value to generate the difference value having the quantized value which has been inverse quantized; and
  a quantization width determiner configured to determine a quantization width used in the inverse quantizer, on a pixel-by-pixel basis, based on encoded quantization information and an encoded quantized value, and
the quantization width determiner adaptively changes quantization widths for respective pixels used in the inverse quantizer on a pixel-by-pixel basis.

26. A solid imaging element comprising:
the image encoding device of claim 18.

27. The image encoding method of claim 9, wherein the quantization width determination step includes
  an initial quantization width calculation step of calculating a first quantization width corresponding to a largest difference value in the group, and
  an edge portion quantization width calculation step of calculating a second quantization width used in quantization of an edge portion and a third quantization width used in quantization of a flat portion.

28. An apparatus for receiving pixel data of a pixel to be compressed, and compressing received pixel data, the apparatus comprising:
a processing unit, and
a memory storing a program,
wherein the program, when executed by the processing unit, causes the processing unit to perform steps in the image encoding method of claim 1.

* * * * *